United States Patent
Morimoto et al.

[11] Patent Number: 5,938,718
[45] Date of Patent: *Aug. 17, 1999

[54] VEHICULAR NAVIGATION SYSTEM PROVIDING DIRECTION DATA

[75] Inventors: Kyomi Morimoto; Kazuteru Maekawa; Akimasa Nanba; Wataru Ishikawa, all of Anjo, Japan

[73] Assignee: Aisin Aw Co., Ltd., Anjo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,428

[22] Filed: Sep. 6, 1995

[30] Foreign Application Priority Data

Sep. 20, 1994 [JP] Japan ................................. 6-224911
Sep. 22, 1994 [JP] Japan ................................. 6-228299

[51] Int. Cl.$^6$ ..................... G01C 21/00; G06F 165/00
[52] U.S. Cl. ..................... 701/201; 701/209; 701/211; 340/990
[58] Field of Search ..................... 701/201, 202, 701/207, 208, 209, 211; 340/990, 995

[56] References Cited

U.S. PATENT DOCUMENTS

| | | | |
|---|---|---|---|
| 4,782,447 | 11/1988 | Ueno et al. | 364/449.2 |
| 4,937,570 | 6/1990 | Matsukawa et al. | 340/905 |
| 4,937,751 | 6/1990 | Nimura et al. | 701/211 |
| 5,121,326 | 6/1992 | Moroto et al. | 364/449.6 |
| 5,168,452 | 12/1992 | Yamada et al. | 364/444.2 |
| 5,177,685 | 1/1993 | Davis et al. | 364/443 |
| 5,206,811 | 4/1993 | Itoh et al. | 364/449.5 |
| 5,272,638 | 12/1993 | Marin et al. | 701/202 |
| 5,444,629 | 8/1995 | Kishi et al. | 364/449.5 |
| 5,452,212 | 9/1995 | Yokoyama et al. | 364/443 |
| 5,463,554 | 10/1995 | Araki et al. | 340/995 |
| 5,475,599 | 12/1995 | Yokoyama et al. | 364/449.5 |
| 5,486,822 | 1/1996 | Tenmoku et al. | 364/449.3 |
| 5,508,931 | 4/1996 | Snider | 701/207 |
| 5,587,911 | 12/1996 | Asano et al. | 364/444.2 |

FOREIGN PATENT DOCUMENTS 0 580 105 A1  1/1994  European Pat. Off. .

*Primary Examiner*—Tan Q. Nguyen
*Attorney, Agent, or Firm*—Burns, Doane, Swecker & Mathis, LLP

[57] ABSTRACT

In order to provide a driver with guidance for a direction of travel without confusing the driver even in a case where the angular difference between an approach road and a departing road at a branch point is very small or even when a branch point has a complicated shape, a navigation system is provided with present-position sensor for calculating present position of the vehicle; an input for entering information necessary for calculating a route; an output for giving notification of information for carrying out route guidance; an information storage device in which all data necessary to carry out route guidance has been stored; route calculator for calculating a route based upon the information entered by the input; route storage for temporarily storing the route calculated by the route calculator; and a guidance control unit for outputting guidance information relating to the route to the output. The information storage device stores branch-point data and road data connected to branch points and has direction data indicative of a departing road with respect to an approach road connected thereto by a branch point. The guidance control unit outputs the guidance information to the output based upon the direction data.

8 Claims, 25 Drawing Sheets

FIG. 3(A)
Suggested-road data

| Number of roads (n) | |
|---|---|
| 1 | Road No. |
| | Length |
| | Road-attribute data |
| | Shape-data address & size |
| | Guidance-data address & size |
| ⋮ | |
| n | |

FIG. 3(B)
Shape data

| Number of nodes (m) | |
|---|---|
| 1 | East longitude |
| | North latitude |
| ⋮ | |
| m | |

FIG. 3(C)
Guidance data

| Intersection name |
|---|
| Precaution data |
| Road name data |
| Road-name audio data address & size |
| Destination data address & size |

FIG. 3(D)
Destination data

| Number of destinations (k) | |
|---|---|
| 1 | Destination road No. |
| | Destination name |
| | Destination-name audio data address & size |
| | Destination direction data |
| | Travel guidance data |
| ⋮ | |
| k | |

FIG. 3(E)
Destination direction data

- −1 : Invalidity
- 0 : Disused
- 1 : Straight ahead
- 2 : Rightward direction
- 3 : Diagonally rightward direction
- 4 : Direction to return to right
- 5 : Leftward direction
- 6 : Diagonary leftward direction
- 7 : Direction to return to left

FIG. 4A

Road-attribute data

Yes/no information  Yes: ○

| | | |
|---|---|---|
| Overpass/ underpass data | Overpass | |
| | Alongside overpass | |
| | Underpass | ○ |
| | Alongside underpass | |
| Number of lanes | Three or more lanes | |
| | Two lanes | ○ |
| | One lane | |
| | No center line | |

FIG. 4B

Road name data

| Road classification | Classification No. |
|---|---|

| | | |
|---|---|---|
| Main expressway | Main road | 1 |
| | Ancillary | 2 |
| Municipal expressway | Main road | 3 |
| | Ancillary | 4 |
| Toll | Main road | 5 |
| | Ancillary | 6 |
| General roads { | National road | 7 |
| | Prefectural road | 8 |
| | Mis'c | 9 |

Precaution data

| Railroad crossing | ○ |
|---|---|
| Tunnel entrance | |
| Tunnel exit | |
| Point of reduced width | |
| None | |

Travel guidance data

| Bear right | |
|---|---|
| Bear left | |
| Bear towards center | ○ |
| None | |

FIG. 8
Guidance to general road
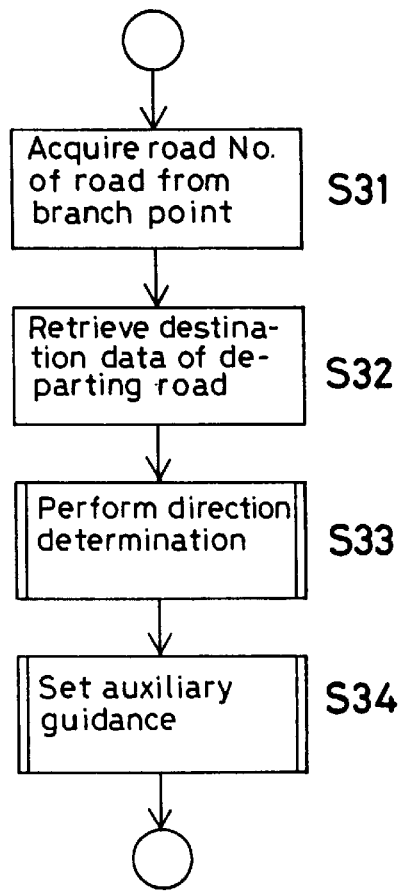
S31: Acquire road No. of road from branch point
S32: Retrieve destination data of departing road
S33: Perform direction determination
S34: Set auxiliary guidance
FIG. 9A
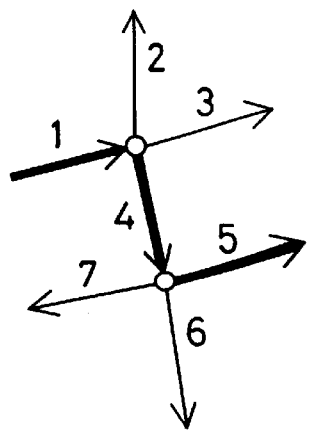
FIG. 9B
Suggested-road No. data
| Number of suggested roads(n) |
|---|
| 1 |
| 4 |
| 5 |
| ⋮ |
| |
| |

FIG.13

| θm (°) | Area containing Ra | Expression allocated to each area |
|---|---|---|
| −70≦θm<−40 | 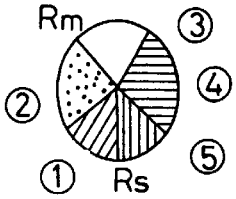 | ① "Turn so as to return to left"<br>② "Turn left"<br>③ "Bear right"<br>④ "Turn right"<br>⑤ "Turn so as to return to right" |
| −40≦θm<−10 | 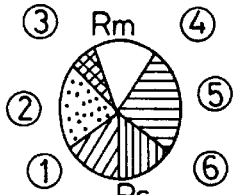 | ① "Turn so as to return to left"<br>② "Turn left"<br>③ "Bear left"<br>④ "Bear right"<br>⑤ "Turn right"<br>⑥ "Turn so as to return to right" |
| −10≦θm≦10 | 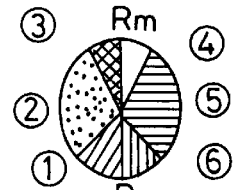 | ① "Turn so as to return to left"<br>② "Turn left"<br>③ "Gear diagonally leftward"<br>④ "Gear diagonally rightward"<br>⑤ "Turn right"<br>⑥ "Turn so as to return to right" |
| 10<θm≦40 | 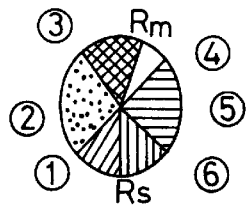 | ① "Turn so as to return to left"<br>② "Turn left"<br>③ "Bear left"<br>④ "Bear right"<br>⑤ "Turn right"<br>⑥ "Turn so as to return to right" |
| 40<θm≦70 | 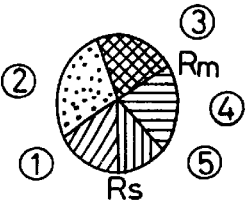 | ① "Turn so as to return to left"<br>② "Turn left"<br>③ "Bear left"<br>④ "Turn right"<br>⑤ "Turn so as to return to right" |

"Beep. Take the diagonally rightward direction at Fukuda-cho, which is about 300 meters ahead."

"Beep. Take the leftward direction at Iidabashi, which is about 300 meters ahead. This is the Suidobashi district."

"Beep. Go straight ahead about 300 meters ahead. Take the overpass."

"Beep. Take the leftward direction about 300 meters ahead. Then enter the left lane."

When data is "Bear towards center":
"Beep. Bear towards the center lane ahead."

When data is "Overpass":
"Beep. Take overpass ahead."

When data is Railroad crossing":
"Beep. You will pass a railroad crossing ahead."

"Beep. The way to the Tokyo-Nagoya expressway is about 300 meters ahead."

"Beep. The way to the Tokyo-Nagoya expressway is ahead."

"Beep. The way to Kyoto is ahead of the toll gate."

"Beep. The way to Shizuoka is ahead of the toll gate."

"Beep. The way to Kyoto is about one killometer ahead. Take the rightward direction."

"Beep. The exit of the Komaki higashi interchange of the expressway is about one kilometer ahead."

"Beep. The downtown Tajimi & Minokamo districts are ahead of the toll gate."

"Beep. The Kyoto district is ahead of the toll gate."

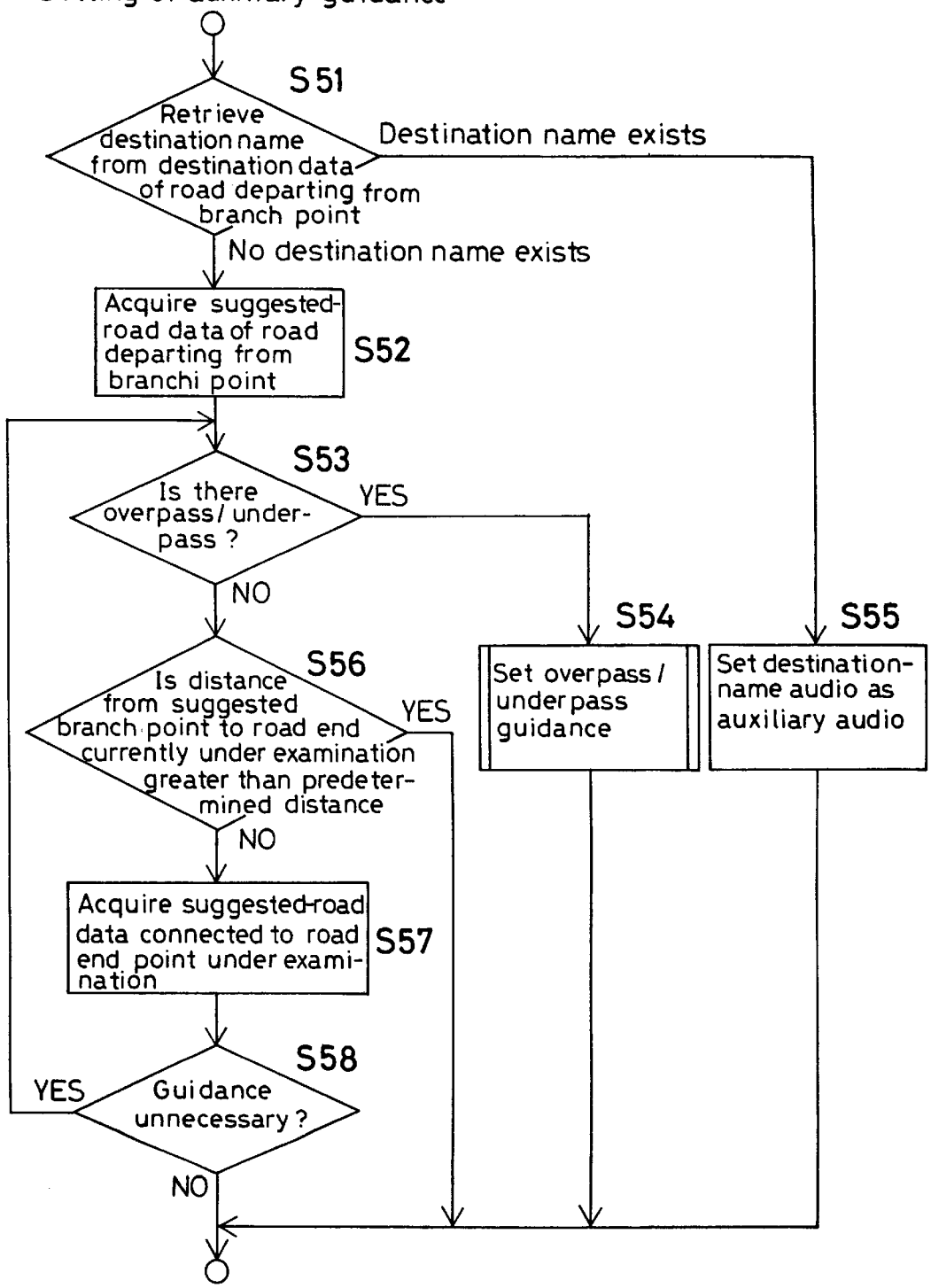

"Go straight ahead about 300 meters ahead.
Take the overpass." "Go straight ahead soon.
Take the overpass."

"Take the leftward direction at Yotsuya yon-chome 300 meters ahead."
"Take the leftward direction soon. Enter the tunnel."

VEHICULAR NAVIGATION SYSTEM PROVIDING DIRECTION DATA

BACKGROUND OF THE INVENTION

This investigation relates to vehicular navigation system for providing a driver with guidance in a direction to be traveled at a branch point.

A vehicular navigation system mounted in an automotive vehicle or the like provides route guidance by searching for a route from the present position of the vehicle in response to entry of a location such as the destination. In a case where the vehicle traverses a branch point such as an intersection, a route is displayed on a display screen and the direction of travel can also be instructed to the driver by a voice track, so that the driver will not need to look at the display, in order to inform the driver of whether the branch point should be passed through without turning or whether a left or right turn should be made at the branch point. For example, in a case where the heading of the approach road is taken as the reference and the angular difference between the approach heading and the departure heading at the branch point where route guidance is given is less than a predetermined angle, a decision to travel straight ahead is rendered. If the angular difference is less than the predetermined angle, the decision rendered is to turn left or right and such route guidance is provided by voice. (This technique has been proposed in Japanese Patent Application No. HEISEI 4-193572.)

However, when the direction of travel is decided by the angular difference, as in the foregoing method, a decision to travel straight ahead is always rendered and guidance to this effect given if the angular difference between the approach heading and the forward heading is very small. Consequently, it is necessary for the driver to look at a drawing of the intersection or a map displayed on the display screen in order to verify whether the direction to be traveled is erroneous or to confirm the direction to be traveled without relying solely upon the guidance given by voice.

For example, as shown in FIG. 24, assume that the departing roads with respect to an approach road at a four-way intersection are a road A 30° to the left, a road B 10° to the right and a road C 90° to the right, and that the road C is narrower than roads A and B. If travel straight ahead is decided for all cases in which the angle is less than, say, 20° with respect to the approach direction, then, when guidance is provided with respect to road B, road B is decided as being that for travel straight ahead at this four-way intersection. However, since road C is narrow, the four-way intersection is judged to be a Y-intersection which branches into the roads A and B, and there is a high possibility that the road B will be judged as being in the direction to the right. Thus, the route guidance given and the driver's judgment to do not agree. In order for the driver to confirm whether the direction to be traveled is erroneous or to verify the direction to be traveled, it is required that the driver verify the direction of travel by observing the drawing of the intersection or a map displayed on the display screen.

Further, there are many cases where the angle of intersection between the main road and exit road at the exit of a bypass or the like is very small. If the above-mentioned determination based upon direction is adopted in such case, guidance to travel straight ahead will be given for the exit road as well and it will therefore be necessary for the driver to confirm the road on the display. If the driver relies solely upon audio guidance, the driver will continue traveling as is and will pass the exit.

Further, the specification of Japanese Utility Model Laid-Open Application No. 60-13413 illustrates an arrangement in which a course in which travel is to take place next at a branch point is specified by an audio expression of eight directions (forward, backward, right, left, diagonally right, diagonally left, etc.) based upon the angle with respect to the approach direction. In accordance with route guidance based upon such audio information, guidance can be provided without having the driver observe the display and without any adverse influence upon driving.

In this navigation system, however, it is so arranged that judgment is made based upon the angle with respect to the approach direction. Therefore, when guidance is given at a branch point or intersection with a complicated shape, as shown in FIG. 25, for example, there are cases where the driver cannot accurately judge the direction in which to travel based solely upon the indication of forward direction. In other words, at a complicated branch point or intersection where one road branches into an underpass, a side road which passes along the side of the underpass and an overpass, it is difficult to specify the forward direction by the audio expression of forward, backward, right, left, diagonally right, diagonally left, etc.

SUMMARY OF THE INVENTION

The present invention seeks to solve the foregoing problems and its object is to provide a vehicular navigation system through which a driver can be furnished with guidance for direction of travel accurately, without confusing the driver, so as to reduce the burden upon the driver even in a case where it is difficult to render a determination of direction to be traveled based upon the angular difference between an approach road and a departing road at a branch point where route guidance is provided, as when the angular difference is very small, and even in a case where a branch point or intersection having a complicated shape exists along the suggested route.

According to the present invention, the foregoing object is attained by providing a vehicular navigation system set forth in claim 1 of the present invention, wherein the system is characterized by comprising:

present-position sensing means 101 for calculating present position of the vehicle;

input means 102 for entering information necessary for calculating a route;

output means 103 for giving notification of information for carrying out route guidance;

an information storage device 104 in which all data necessary to carry out route guidance has been stored;

route calculating means 105 for calculating a route based upon the information entered by the input means 102; and a central processor 108 having route storage means 106 for temporarily storing the route calculated by the route calculating means 105, and guidance control means 107 for outputting guidance information relating to the route to the output means;

the information storage device 104 storing branch-point data and road data connected to branch points and having direction data 109 indicative of a departing road with respect to an approach road connected thereto by a branch point;

the guidance control means 107 outputting the guidance information to the output means 103 based upon the direction data 109.

The navigation system set forth in claim 2 is characterized in that the guidance control means 107 has determination means for determining whether the direction data 109 indicative of a departing road with respect to an approach road connected thereto by a branch point resides in the route storage means 106, the guidance control means 107 outputting the guidance information to the output means 103 based upon the direction data in a case where the direction data resides in the route storage means.

The navigation system set forth in claim 3 is characterized in that the guidance control means 107 has arithmetic means for calculating direction of travel based upon an angular difference which the departing road forms with the approach road, the direction of travel being calculated by the arithmetic means and the guidance control means 107 outputting the guidance information to the output means 103 based upon the direction of travel in a case where the direction data is found not to reside in the route storage means by the determination means.

The navigation system set forth in claim 4 is characterized in that the output means 103 comprises display means 110 for giving notification, on a screen, of the information necessary to carry out route guidance, and/or voice output means for giving notification, by voice, of the information necessary to carry out route guidance, and that the guidance control means 107 comprises display control means 112 for outputting the guidance information to the display means 110 and/or voice control means 113 for outputting the guidance information to the voice output means 111.

The navigation system set forth in claim 5 is characterized in that the display control means 112 outputs arrow information indicating direction based upon the direction data 109 to the output means 103, and the display means 110 displays an arrow on the screen based upon the arrow information.

By virtue of the arrangement described above, direction data indicative of a departing road relative to an approach road connected thereto by a branch point is added onto data referred to when guidance is carried out. When guidance for direction of travel is provided, guidance information is outputted based upon the direction data. Therefore, in a case where it is difficult to render a determination of direction to be traveled based upon an angular difference between the approach road and the departing road at a branch point where route guidance is provided, as when the angular difference is very small, a driver can be reliably furnished with guidance for direction of travel at the branch point, without confusing the driver, so as to reduce the burden upon the driver.

According to the present invention, the foregoing object is attained by providing a vehicular navigation system set forth in claim 6 of the present invention, wherein the system is characterized by comprising:

present-position sensing means for calculating present position of the vehicle;

input means for entering information necessary for calculating a route;

output means for giving notification of information for carrying out route guidance;

information storage means in which all data necessary to carry out route guidance has been stored;

route calculating means for calculating a route based upon the information entered by the input means; and guidance control means for reading out data, which has been stored in the information storage means, along the route calculated by the route calculating means, and outputting this data to the output means;

wherein the information storage means stores route-guidance auxiliary information data, and the guidance control means reads data relating to a branch point at which guidance is required for travel forward of the present position, which has been sensed by the present-position sensing means, out of data relating to a route, which has been stored in the information storage means, in a case where the present position is on a route, currently being suggested, calculated by the route calculating means; the guidance control means having determination means for determining whether the route-guidance auxiliary information is to be added onto guidance relating to the branch point, wherein when it has been determined by the determination means that the route-guidance auxiliary information is to be added to the guidance relating to the branch point, the guidance control means adds the route-guidance auxiliary information to the guidance relating to the branch point and then outputs the result to the output means.

By virtue of the above-described arrangement, the features of a road such as an overpass, underpass or complicated intersection are put into the form of data in route-guidance auxiliary information. In a case where a road in a direction departing from a branch point has data indicative of an overpass or underpass, or in a case where the road has a name for the direction in which it is headed, the route-guidance auxiliary information is added to the audio guidance output instructing the direction of travel, whereby guidance regarding an overpass, underpass or name is provided by voice. Accordingly, even if a road ahead of a left or right turn divides or even if a branch point is a complicated intersection, the driver can be given guidance reliably without confusion and the burden upon the driver can be alleviated.

Further, in order to make the determination as to whether the data in the route-guidance auxiliary information is to be added to the audio guidance output instructing the direction of travel, data relating to the road departing from the branch point is retrieved within a prescribed range of distances. If data indicting an overpass or underpass is present within this range, the data is outputted in the form of a voice. Accordingly, if there is an overpass, underpass or complicated intersection immediately after a left or right turn is made and there is not enough time to judge which road should be taken, information regarding the road to be taken can be obtained before the vehicle enters the intersection at which the left or right turn is to be made.

Still other objects and advantages of the invention will in part be obvious and will in part be apparent from the specification.

The invention accordingly comprises the features of construction, combinations of elements and arrangement of parts hereinafter set forth, and the scope of the invention will be indicated in the claims.

BRIEF DESCRIPTION OF THE DRAWINGS

FIGS. 3(A)–(E) are the diagrams showing an example of the construction of a main data file according to the invention shown in FIG. 2;

FIGS. 4(A)–(B) are the diagrams showing an example of the construction of a main data file according to the invention shown in FIG. 2;

FIG. 8 is a flowchart showing the flow of processing for guidance into an ordinary road;

FIG. 9A is a diagram for describing the number of a road leaving the branch point of FIG. 8, and FIG. 9B is a diagram showing the construction of suggested-road number data;

FIG. 13 is a diagram for describing an example of voice-expression allocation in determination based upon heading;

FIG. 17 is a flowchart showing the flow of processing for setting auxiliary guidance;

DESCRIPTION OF THE PREFERRED EMBODIMENTS

Figure 1:
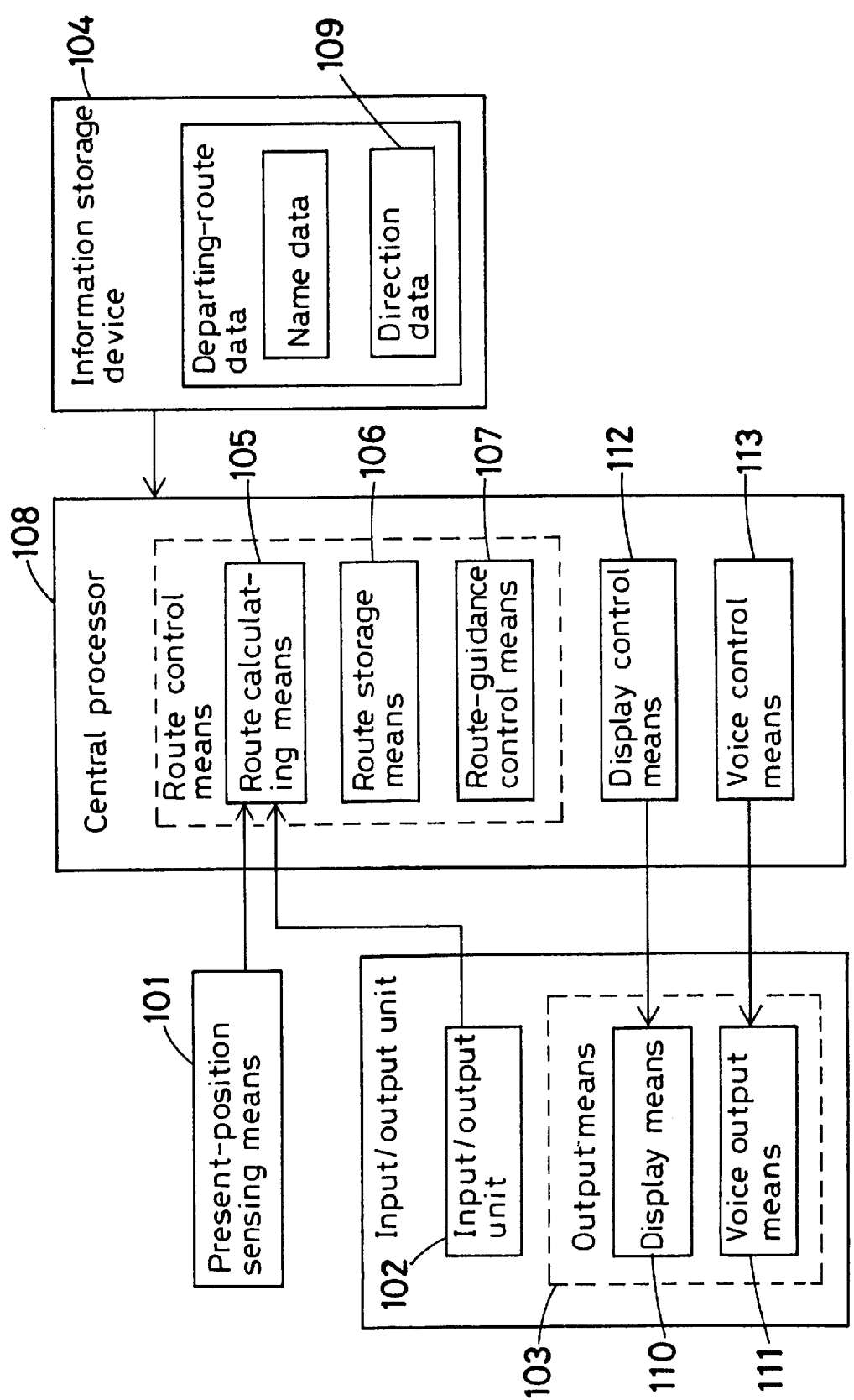
FIG. 1 is a diagram for describing the configuration of the present invention.
Figure 2:
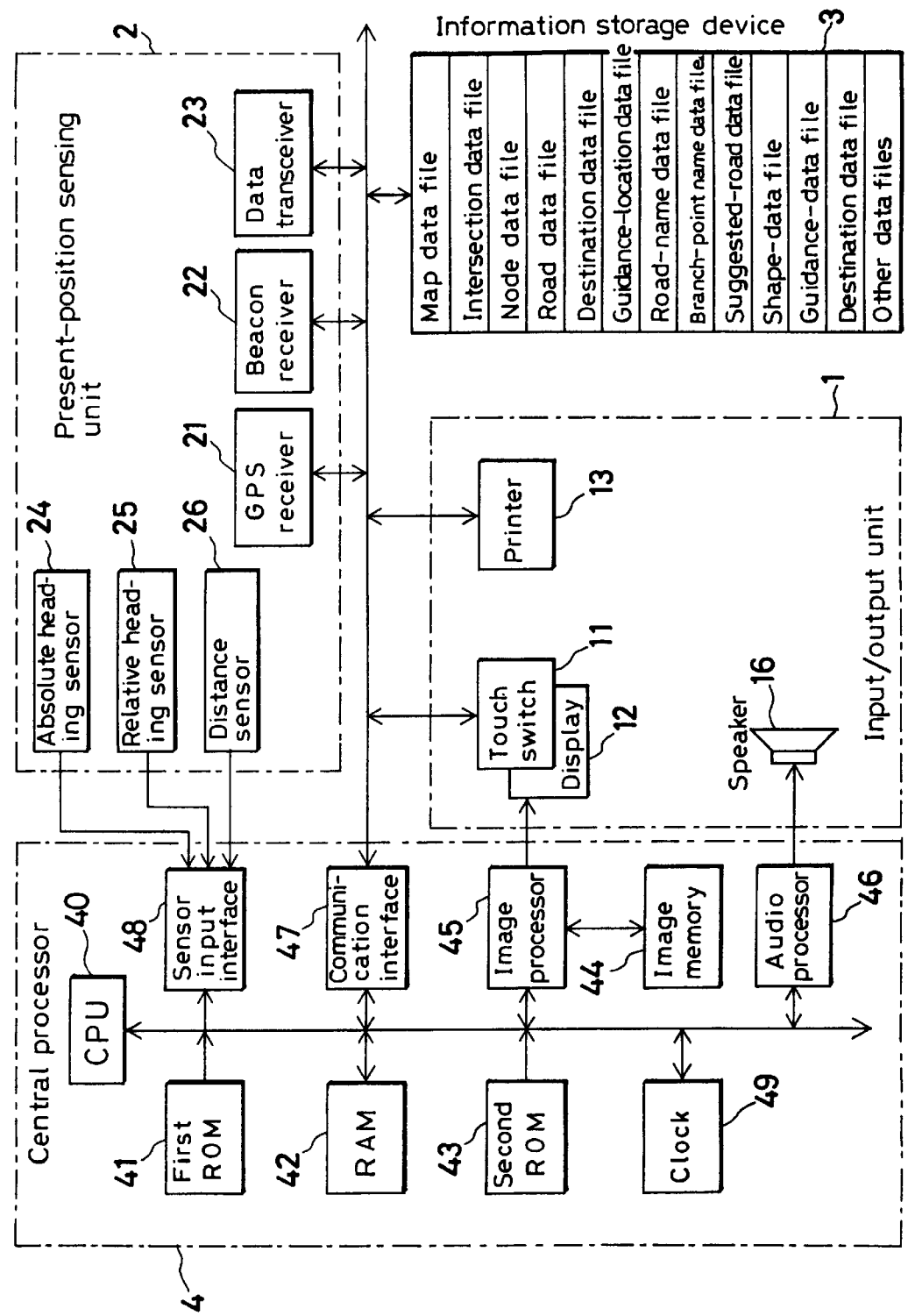
FIG. 2 is a block diagram showing one embodiment of a vehicular navigation system according to the present invention.

Embodiments of the present invention will now be described with reference to the drawings. FIG. 2 is a block diagram showing one embodiment of a vehicular navigation system according to the present invention. The vehicular navigation system according to this embodiment comprises an input/output unit 1 for input/output of information relating to route guidance, a present-position sensing unit 2 for sensing information relating to the present position of an automotive vehicle, an information storage device 3 in which navigation data necessary for route calculation and display guidance data necessary for instructional guidance have been recorded, and a central processor 4 for executing route finding processing, display guidance processing necessary for route guidance, and control of the overall system. Each of these components will now be described.

The input/output unit 1 functions to enter destinations, to allow the driver to instruct the central processor 4, at the volition of the driver, to execute navigation processing in such a manner that guidance information can be outputted by at least voice or a screen display when required by the driver, and to print out processed data. As means for implementing these functions, the input section of the input/output unit has a touch switch 11 and operation switch for entering a destination in the form of a telephone number or coordinates, and for requesting route guidance. The output section has a display 12 for displaying input data on a screen and, moreover, for automatically displaying route guidance on the screen in response to a request from the driver, a printer 13 for printing out data processed by the central processor 4 and data stored in the information storage device 3, and a speaker 16 for outputting route guidance by voice.

The display 12 is constituted by a color CRT or color liquid-crystal display device. On the basis of map data and guidance data processed by the central processor 4, the display 12 outputs, as a color display, all screens necessary for navigation, such as a route setting screen, a screen of an interval view and a screen of intersections. The display 12 also displays buttons for setting route guidance and for changing over guidance and screens during the route instruction. In particular, transit-intersection information such as the names of intersections to be traversed is displayed in color in the form of a pop-up menu on the interval view when required.

The display 12 is provided inside the instrument panel in the vicinity of the driver's seat. Observing displayed map enables the driver to ascertain the present location of the vehicle and to obtain information regarding a route from this location. The display 12 is provided with the touch panel 11 that corresponds to the display of function buttons. The operations described above are executed based upon signals entered by touching the buttons. Input signal generating means constituted by the buttons and touch panel constructs the input section, though a detailed description thereof is deleted.

The present-position sensing unit 2 has a GPS receiver 21 which utilizes a global positioning system (GPS), a beacon receiver 22, a data transceiver 23 for receiving a GPS correction signal utilizing a cellular phone or FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel.

The information storage device 3 is a data base in which all data necessary for the navigation system has been recorded, the data comprising files required for course guidance, such as map data, intersection data, node data, road data, destination data, guidance-location data, road name data, branch name data, suggested route data, shape data, guidance data, destination data and other data. address data, displayed guidance data and audio guidance data.

The central processor 4 comprises a CPU 40 for executing processing; a first ROM 41 in which are stored a program for executing processing such as route finding, a program for control of display output needed in route guidance and for control of audio output needed in voice guidance, and data required by these programs; a RAM 42 for temporarily storing the location coordinates of a set destination, retrieved route guidance information such as the code number of a road, and data which is in the course of being processed; a second ROM 43 in which display information data necessary for displaying route guidance and maps is stored; an image memory 44 in which image data used to display a screen on the display unit is stored; an image processor 45 which, on the basis of a display-output control signal from the CPU 40, extracts image data from the image memory and delivers the data to the display upon subjecting it to image processing; an audio processor 46 which, on the basis of an audio-output control signal from the CPU, combines audio, phrases, single sentences and sounds read out of the information storage device 3, converts the result to an analog signal and delivers the analog signal to the speaker; a communication interface 47 for performing an exchange of input/output data by communication; a sensor-input interface 48 for accepting a sensor signal from the present-position sensor 2; and a timekeeper 49 for entering date and time into internal dialog information. Route guidance is so adapted that the driver is capable of selecting either a screen display or voice output.

FIGS. 3(A) through 5(B) illustrate diagrams showing an example of the construction of a main data file according to the present invention shown in FIG. 2. The file is stored in the information storage device 3. FIG. 3(A) shows a data file of a suggested road. The file comprises, for each of n-number of roads, a road number, length, road-attribute data, shape data address and size, and guidance data address and size. The road number is set by category of direction (outbound or inbound) for each road between branch points. As shown in FIG. 4(A), the road-attribute data is composed of data indicating whether a road is an overpass, a road alongside an overpass, an underpass or a road alongside an underpass, and data indicating information regarding the number of lanes. The shape data has coordinate data which, when each road is partitioned into a plurality of nodes, comprises east longitude and north latitude for each of m-number of nodes, as shown in FIG. 3(B).

Figures 5A, 5B, 6:
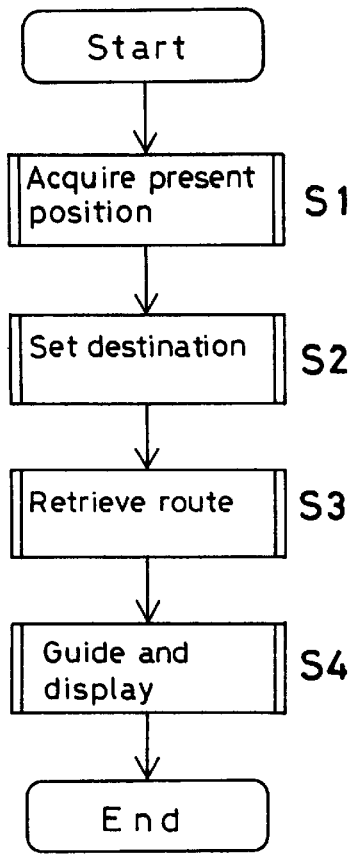
FIGS. 5(A)–(B) are the diagrams showing an example of the construction of a main data file according to the invention shown in FIG. 2.
FIG. 6 is a flowchart for describing the flow of processing of the overall vehicular navigation system according to the present invention.

As illustrated in FIG. 3(C), the guidance data comprises an intersection (or branch point) name, precaution data, road name data, address and size of road-name voice data, and address and size of destination data. As shown in FIG. 5(A), the precaution data is data indicating information relating to railroad crossings, tunnel entrances, tunnel exits, points of reduced road width, "none", etc. This data warns the driver about railroad crossings and tunnels, etc., in addition to branch points. As shown in FIG. 4(B), the road name data is data indicating information of road category, such as expressway, municipal expressway, toll road and general road (national road, prefectural road, etc.), and information indicating whether a road is the main road or ancillary road of an expressway, municipal expressway or toll road. This data is composed of road classification data and classification numbers, namely individual number data for each road classification.

As shown in FIG. 3(D), the destination data comprises destination road number, destination name, the address and size of destination-name voice data, destination direction data and travel guidance data. As shown in FIG. 3(E), the destination direction data is data indicating information representing invalidity (meaning that the destination direction data is not used), disuse (guidance is not given), straight ahead, right direction, diagonally right direction, direction returning to right, left direction, diagonally left direction and direction returning to left. As shown in FIG. 5(B), the travel guidance data stores data for instructing the driver which lane to take when there are a plurality of lanes. The data indicates information instructing the driver to bear right, bear left, bear towards the center or "none".

The flow of processing in the vehicular navigation system of the present invention will now be described.

FIG. 6 is a flowchart for describing the flow of processing of the overall vehicular navigation system according to the present invention. When the program of the route guidance system is started by the CPU 40 of the central processor 4, first the present position is sensed by the present-position sensing unit 2, a map of surroundings centered on the present position is displayed and the name of the present position is displayed (step S1). Next, the destination is set (step S2) using a telephone number and an address, facility name and registered location, etc., after which a route from the present position to the destination is found (step S3). When the route has been decided, route guidance and display are performed repeatedly (step S4), until the destination is reached, while the present position is followed up by the present-position sensing unit 2.

The present invention relates to route guidance at a branch point in the route guidance and display operation of step S4. FIGS. 7, 8 and 10~12 are flowcharts illustrating the flow of this processing. Further, a route for arriving at a destination is set as a continuum of roads between branch points, as shown in FIG. 9A, and road numbers along which the vehicle is guided are retained as items of suggested-road number data arrayed in the order in which guidance is given, as illustrated in FIG. 9B.

Figure 7:
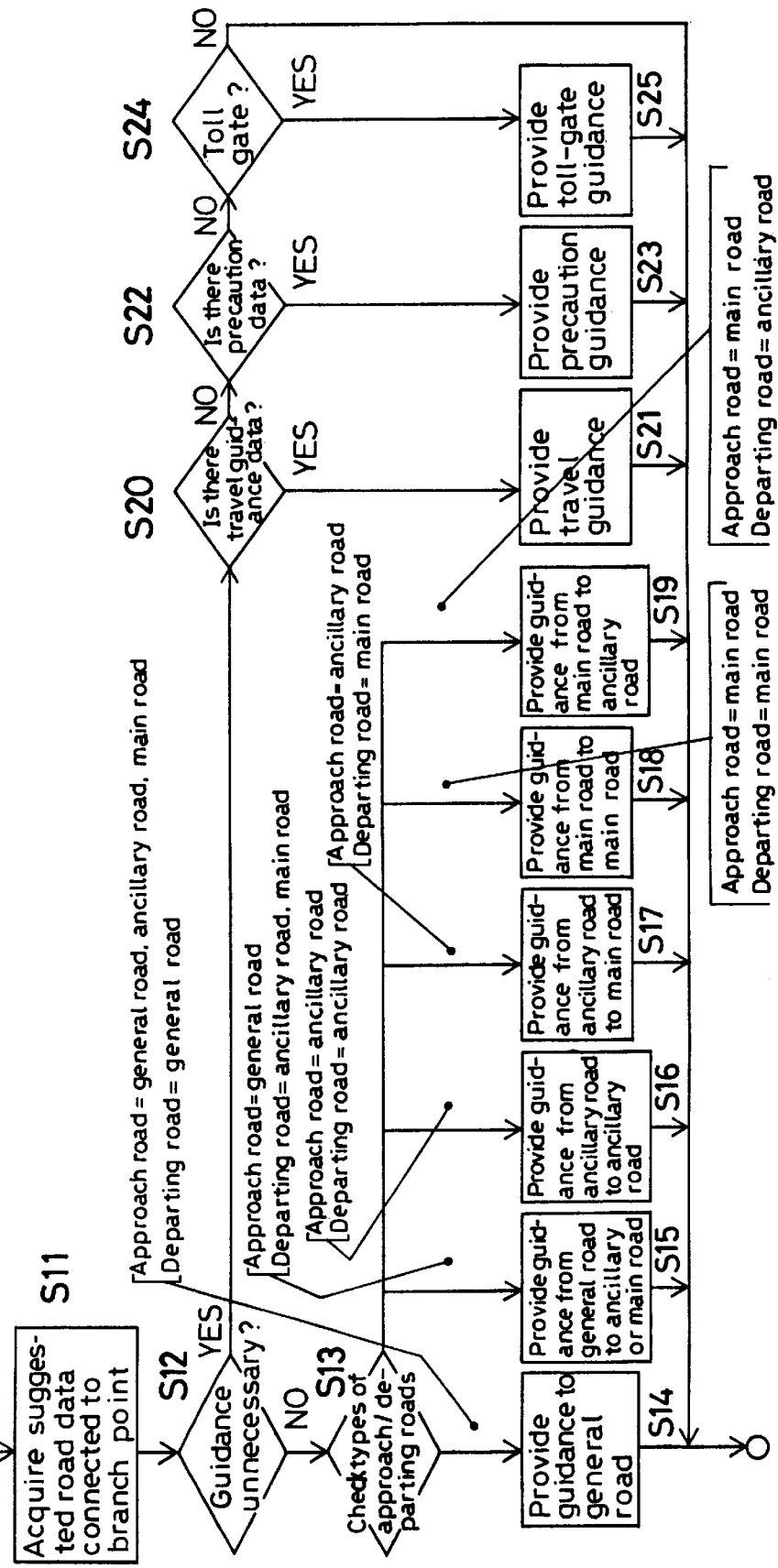
FIG. 7 is a basic flowchart showing processing for route guidance at a branch point in the present invention.

FIG. 7 is a basic flowchart showing processing for route guidance at a branch point in the present invention. First, at step S11, the suggested road (approach road) data of FIG. 3(A), which connects to a branch point, is acquired. Next, at step S12, a check is made to determine, from the destination data of FIG. 3(D), whether the destination direction data of the road (departing road) leaving the above-mentioned branch point is "disused". Thus it is determined whether guidance is necessary or not. If guidance is necessary, then the road name data of FIG. 4(B) is checked, the categories of the approach and departing roads are investigated and the guidance of steps S14~S19 is executed depending upon the category. For example, if the approach road is a general road or the main road or ancillary road of an expressway and the departing road is a general road, then guidance to enter the general road is executed (step S14). If the approach road is a general road and the departing road is the main road or ancillary road of an expressway, then guidance to enter the main road or ancillary road of the expressway from the general road is executed (step S15). Thus, guidance conforming to the categories of the approach road and departing road is executed (steps S16~S19).

If guidance is found to be unnecessary at step S12, then the destination data is checked for travel guidance data [FIG. 5(B)] at step S20. This is the data containing data for instructing the driver which lane to take when there are a plurality of lanes in a departing road. If travel guidance data exists, then guidance to bear right, left or bear towards center is executed at step S21. If there is no travel guidance data, then it is determined at step S22 whether guidance data contains the precaution data [FIG. 5(A)] for warning the driver of railroad crossings, tunnels, etc., other than branch points. If precaution data exists, then travel guidance as to whether a precaution relates to a railroad crossing, a tunnel entrance, tunnel exist or point of reduced road width is executed at step S23. If there is no precaution data, then the destination data is checked for road name data [FIG. 4(B)] of a departing road. If the vehicle is to enter an expressway, municipal expressway or toll road, then guidance to a toll gate is executed at step S25.

FIG. 8 is a flowchart showing the flow of processing for guidance into an ordinary road at step S14, by way of example. First, at step S31, the number of the road departing from the branch point is acquired. Specifically, departing road number 4 is acquired with respect to approach road number 1, and departing road number 5 is acquired when the approach road number is 4, as shown in FIG. 9(A). The guidance-road number data is created, in which the sequence of roads suggested is stored in order, as illustrated in FIG. 9(B). Next, at step S32, destination data of the departing road is retrieved from FIG. 3(D). Processing for direction determination is executed at step S33, and processing for setting auxiliary guidance is performed at step S34. The processing of steps S33, S34 will be described later.

Figure 10:
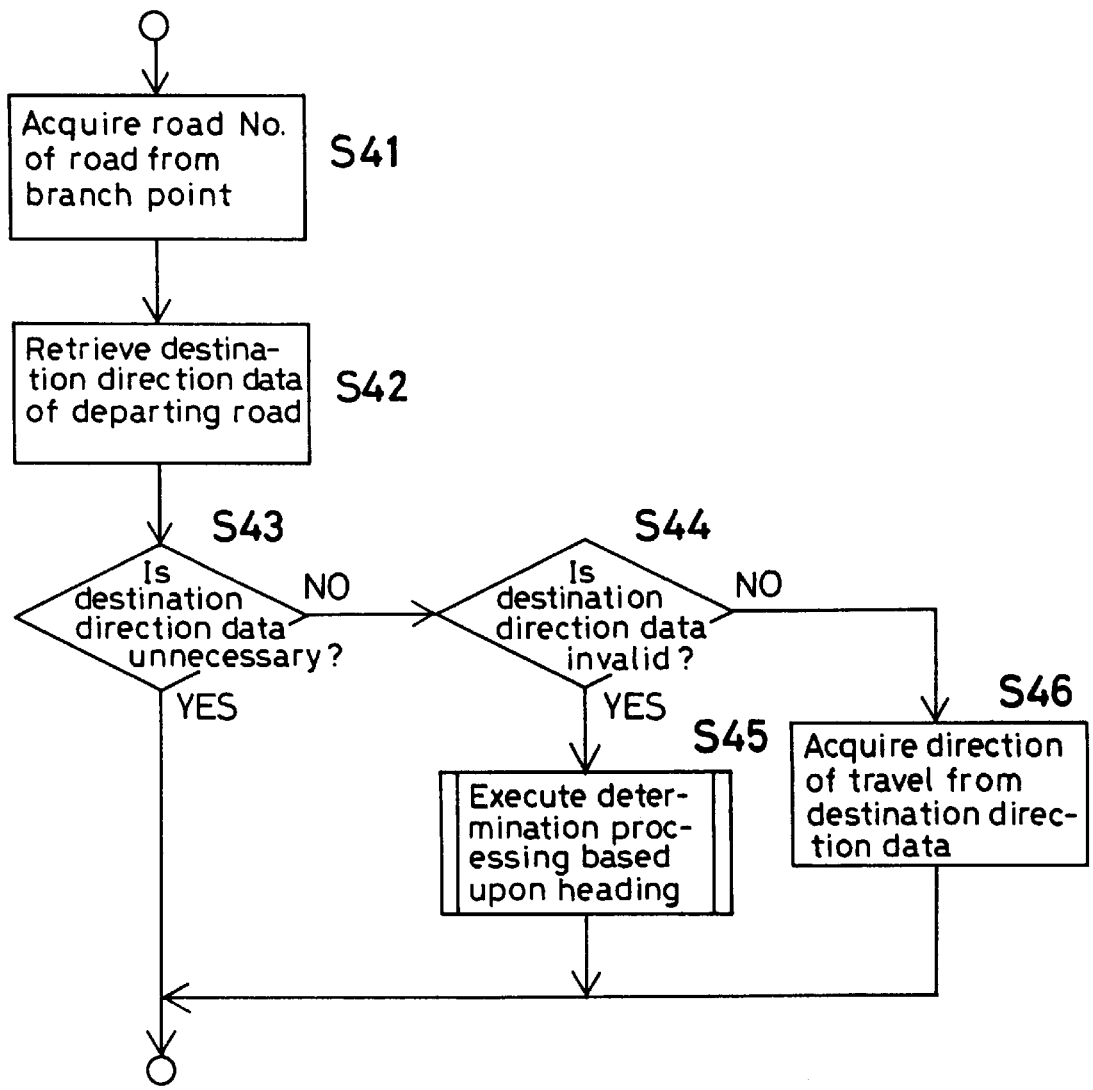
FIG. 10 is a flowchart showing the flow of direction determination processing in FIG. 8.

FIG. 10 is a flowchart showing the flow of direction determination processing at step S33 in FIG. 8. It should be noted that this processing overlaps the processing of steps S31, S32 in FIG. 8. Destination direction data [FIG. 3(E)] in the destination data is retrieved at step S42. The destination direction data is stored, in correspondence with road entering the branch point, in the road data of the road departing from the branch point. Depending upon the positional relationship between the road approaching the branch point and the road departing from the branch point, the data stored decides the direction for auxiliary guidance, deems that guidance of direction is unnecessary ("disused") or indicates "invalidity" in a case where auxiliary guidance is unnecessary and determination of direction is performed by computation. At step S43, it is determined whether the destination direction data of FIG. 3(E) is indicative of "disused". In case of "disused" (guidance unnecessary), no action is taken and program proceeds to the next processing step. If the determination is not "disused", then it is determined at step S44 whether the destination direction data is "invalid". In case of "invalid", determination processing based upon heading is executed at step S45. This processing is a method of adopting the heading of the approach road as the reference, judging that the vehicle should travel straight ahead if the angular difference between the approach heading and the departure heading is less than a predetermined angle, and judging that the vehicle should turn left or right if the angular difference is greater than the predetermined angle.

Figure 11:
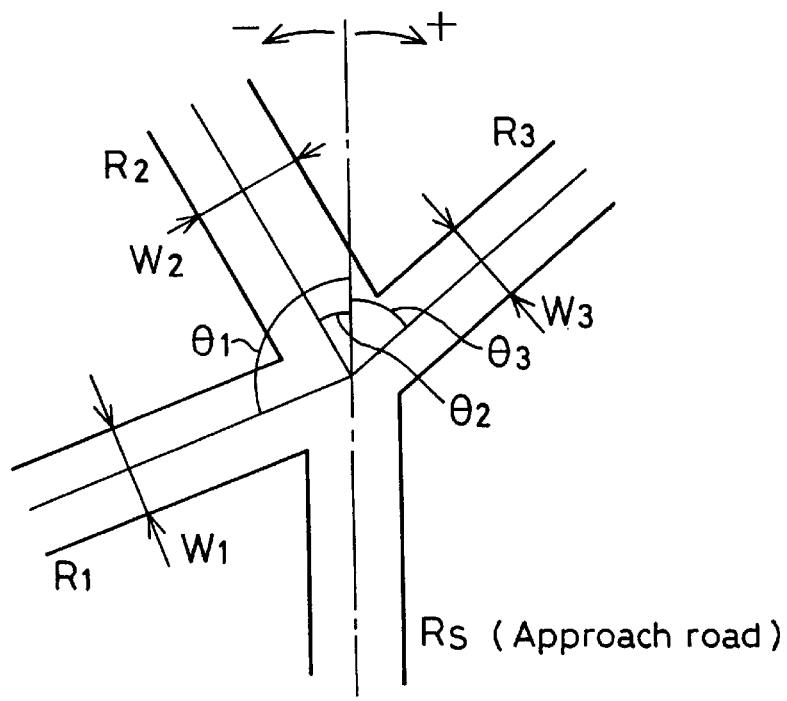
FIG. 11 is a diagram showing the shape of a branch point for describing a determination method based upon heading.
Figure 12:
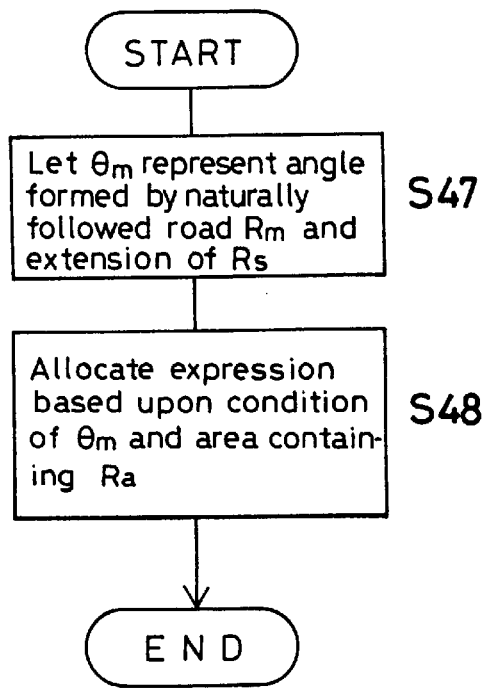
FIG. 12 is a flowchart of determination based upon heading.

This method of determination based upon heading will be described with reference to FIGS. 11~13. FIG. 11 is a diagram showing the shape of a branch point, FIG. 12 is a flowchart, and FIG. 13 is a diagram for describing an example of voice-expression allocation. In FIG. 11, an approach road which the vehicle has entered is indicated at $R_s$, and three roads connected to the branch point are indicated by $R_1$, $R_2$ and $R_3$. According to this method of determination, a road which does not require guidance is referred to as a naturally followed road $R_m$, and the naturally followed road $R_m$ is judged from the number of connecting roads, the connecting angles $\theta_1 \sim \theta_3$ and the widths $W_1 \sim W_3$ of the connecting roads. As shown in FIG. 12, $\theta_m$ is adopted at step S47 as the angle defined by the naturally followed road $R_m$ and an extension of the approach road S. Next, at step S48, voice expression is allocated based upon a condition on the size of $\theta_m$ and the area containing a suggested road (departing road) $R_a$, as shown in FIG. 13. For example, in case of a range defined by $-70 \leq \theta_m < -40$, a voice expression is allocated based upon the area of suggested road $R_a$ in the following manner: ① "TURN SO AS TO RETURN TO LEFT", ② "TURN LEFT", ③ "BEAR RIGHT", ④ "TURN RIGHT" and ⑤ "TURN SO AS TO RETURN TO RIGHT". Since the naturally followed road $R_m$ here is in the leftward direction, the expression "BEAR RIGHT" is actually allocated in a prescribed range situated forward of the approach road $R_s$. The reason for this is as follows: Since there is a tendency for the driver to judge that the naturally followed road has a substantially straight-ahead direction, the expression "BEAR RIGHT" is appropriate in order to clarify the distinction over the naturally followed road.

Thus, in a case where the destination direction data of suggested road data is "invalid", namely when there is no destination direction data, the direction of travel is judged based upon the angle between the heading of the road approaching the branch point and the heading of the road departing from the branch point. By performing direction determination through the above-described method and creating guidance statements for guidance at branch points, direction data need not be provided and the amount of data can be reduced in a case where direction determination is possible from the angles of the approach road and departing road. Furthermore, in a case where a direction determination cannot be made based upon angles, destination direction data is provided as data representing direction. As a result, more reliable route guidance can be provided.

With reference again to FIG. 10, if the destination direction data is found to be "invalid" at step S44, then direction of travel, namely straight ahead, rightward, diagonally rightward, direction to return right, leftward, diagonally leftward and direction to return to left, is acquired from the destination direction data of FIG. 3(E).

Figure 14A:
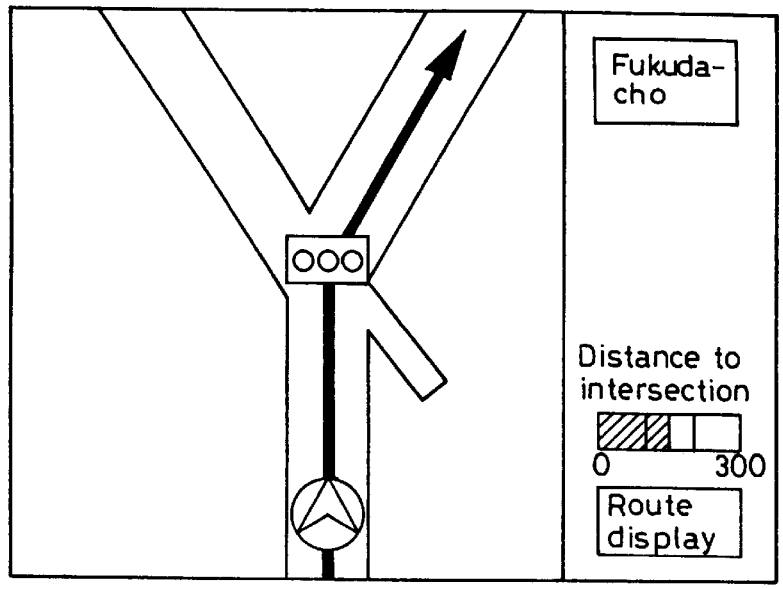
FIGS. 14(A)–(E),15(A)–(F) and 16(A)–(B) are diagrams for describing route guidance at a branch point in conformity with examples of screens.
Figure 14B:
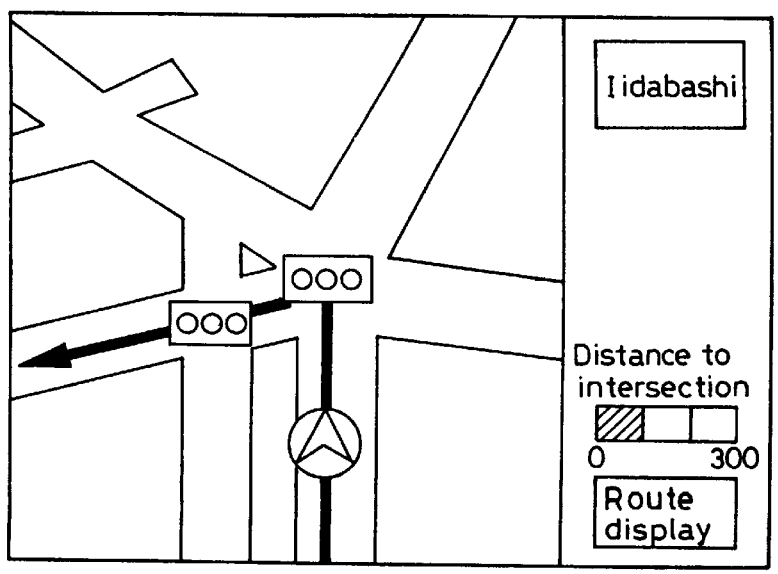
Figure 14:
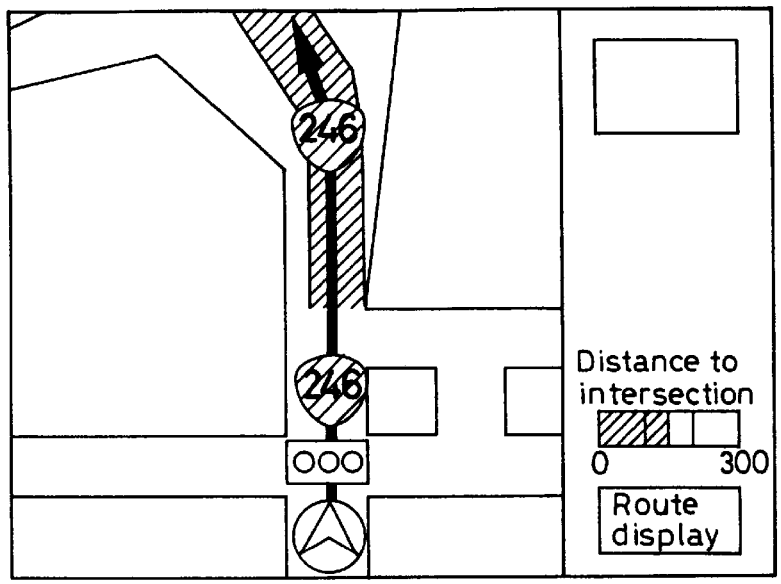
Figure 14:
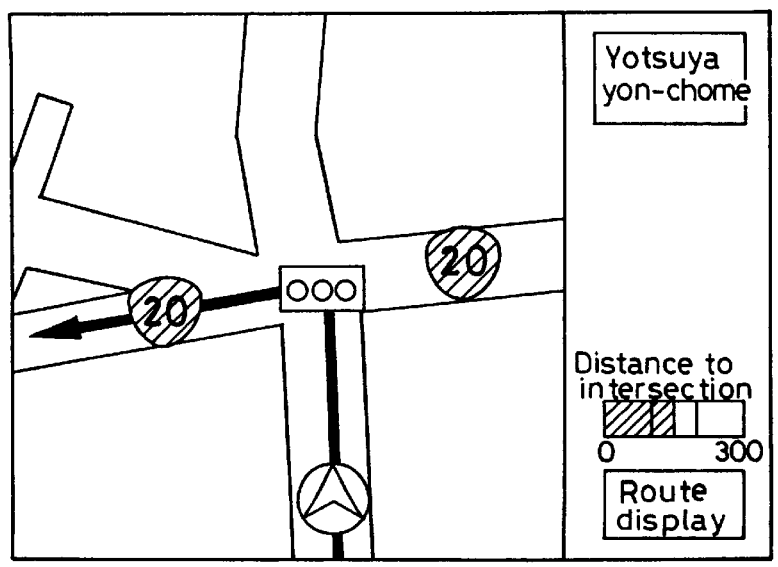
Figure 14E:
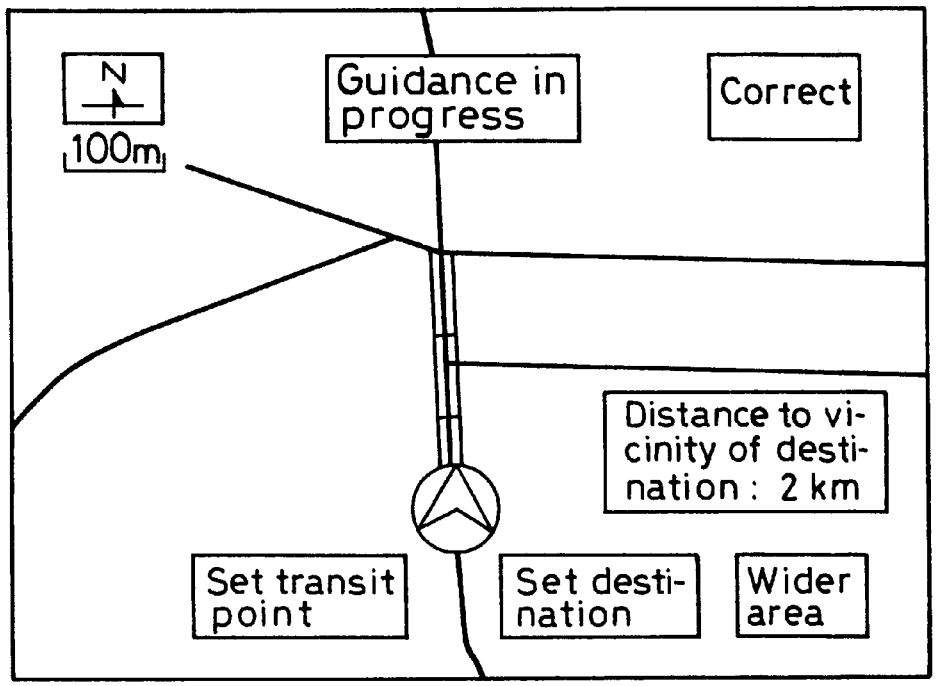

Next, route guidance at a branch point will be described in conformity with a specific example of a screen. FIGS. 14(A)–(E) are for the cases where the approach road and departing road are both general roads. In FIG. 14A, voice guidance to the effect "BEEP. TAKE THE DIAGONALLY RIGHTWARD DIRECTION AT FUKUDA-CHO (the name of the intersection), WHICH IS ABOUT 300 METERS AHEAD." is provided when the destination direction data of FIG. 3(E) IS "3". In FIG. 14B, voice guidance to the effect "BEEP. TAKE THE LEFTWARD DIRECTION AT IIDABASHI, WHICH IS ABOUT 300 METERS AHEAD. THIS IS THE SUIDOBASHI DISTRICT." is provided when the destination direction data is "5" and there is a destination name. In FIG. 14(C), voice guidance to the effect "BEEP. GO STRAIGHT AHEAD ABOUT 300 METERS AHEAD. TAKE THE OVERPASS." is provided when the destination direction data is "1" and the road-attribute data is "BEEP. OVERPASS (GRAY AREA)". In FIG. 14(D), voice guidance to the effect "BEEP. TAKE THE LEFTWARD DIRECTION ABOUT 300 METERS AHEAD. THEN ENTER THE LEFT LANE." is provided when the destination direction data is "5" and the travel guidance data "BEAR LEFT". These examples are such that voice guidance is provided together with guidance by an intersection drawing. However, FIG. 14E illustrates an example in which voice guidance is provided without guidance using an intersection drawing. When travel guidance data is "BEAR TOWARDS THE CENTER", voice guidance to the effect "BEEP. BEAR TOWARDS THE CENTER LANE AHEAD." is provided. When the precaution data includes "RAILROAD CROSSING", guidance to the effect "BEEP. YOU WILL PASS A RAILROAD CROSSING AHEAD." is provided.

Figure 15A:
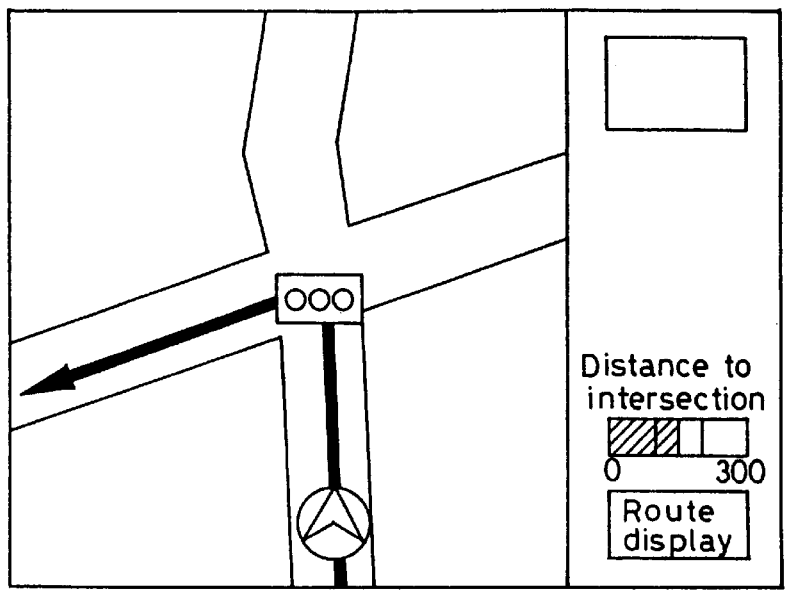

FIGS. 15(A)–(F) illustrate voice guidance in the vicinity of an expressway or the like. In FIG. 15A, voice guidance to the effect "BEEP. THE WAY TO THE TOMEI EXPRESSWAY IS ABOUT 300 METERS AHEAD." is provided when the expressway is to be entered. When there is no destination data, voice guidance to the effect "BEEP. THE EXPRESSWAY IS ABOUT 300 METERS AHEAD." is given.

Figure 15B:
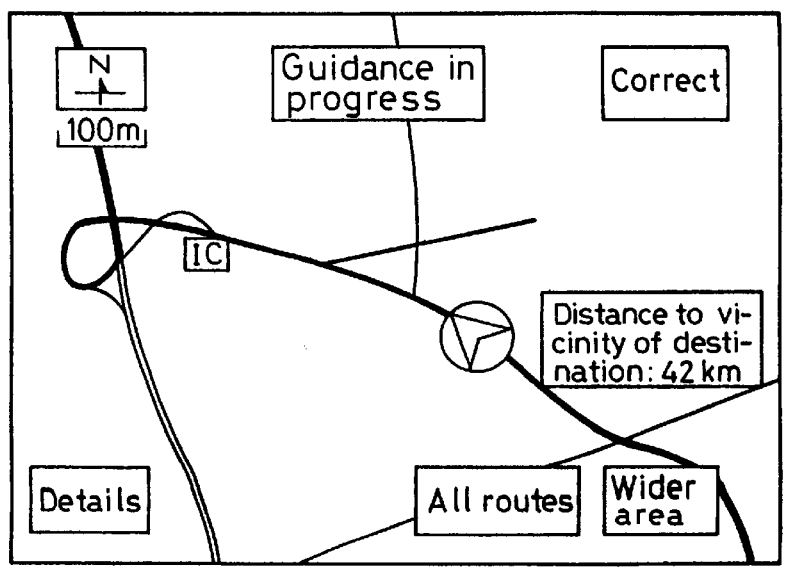

In FIG. 15B, voice guidance for guidance to a toll gate to the effect "BEEP. THE WAY TO THE TOMEI EXPRESSWAY IS AHEAD." is provided when guidance based upon ordinary main audio is unnecessary. When there is no destination data, voice guidance to the effect "BEEP. THE EXPRESSWAY IS AHEAD." is given.

Figure 15C:
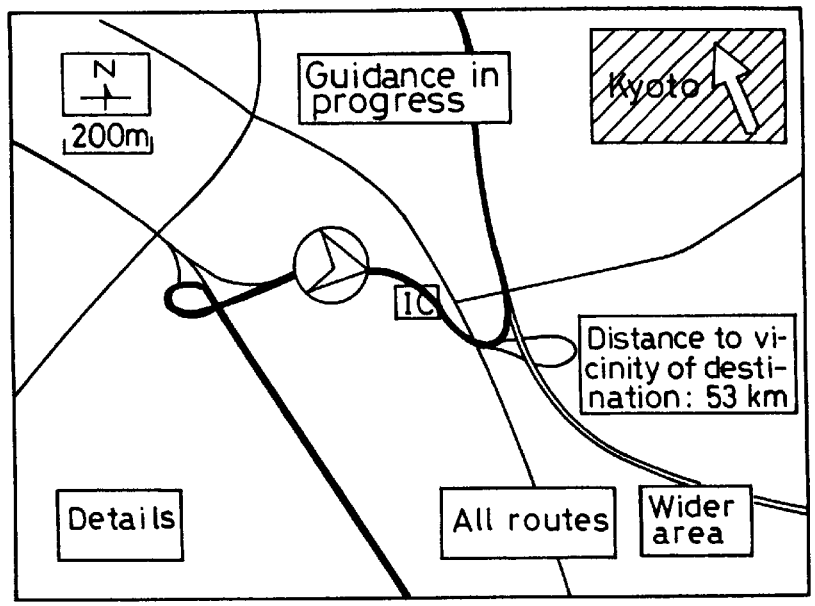

In FIG. 15C, voice guidance to the effect "BEEP. THE WAY TO KYOTO IS AHEAD OF THE TOLL GATE" is provided in a case where a toll gate is located in front of a guidance branch point and, moreover, there is destination direction data or direction determination is possible based upon the angular difference when the vehicle proceeds from an ancillary road to an ancillary road. Further, an arrow indicating the direction is displayed on the map screen along with the name of the district.

Figure 15D:
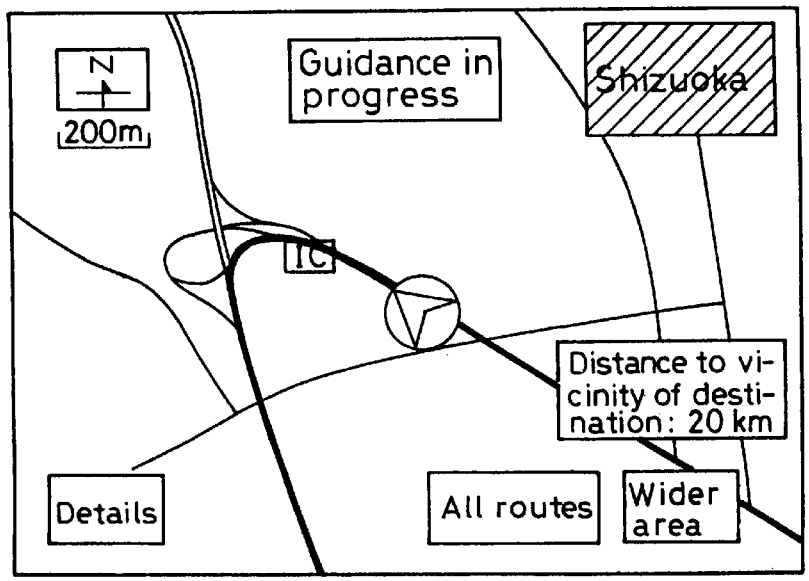

In FIG. 15D, voice guidance to the effect "BEEP. THE WAY TO SHIZUOKA IS AHEAD OF THE TOLL GATE" is provided in a case where a toll gate is located in front of a guidance branch point and, moreover, there is no destination direction data and direction determination is impossible when the vehicle proceeds from an ancillary road to an ancillary road. Further, only the name of the district is displayed on the map screen.

Figure 15E:
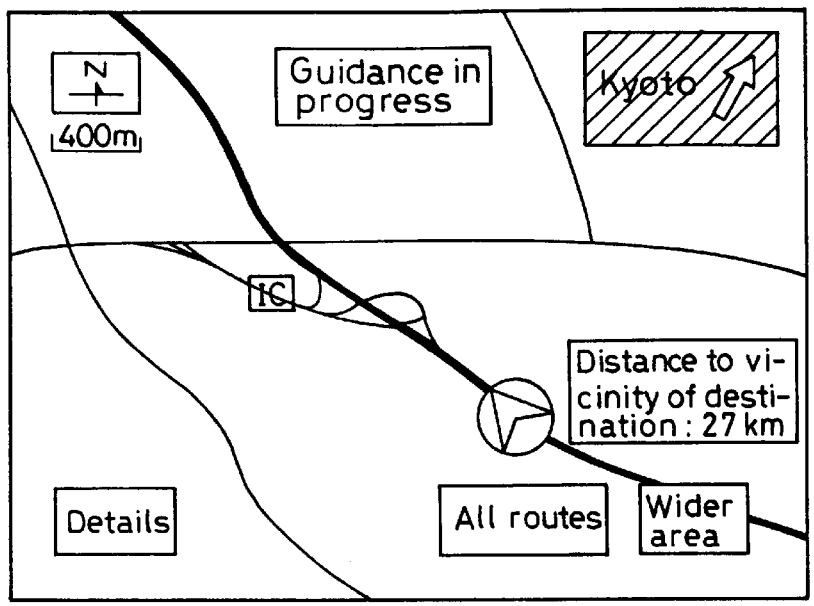

In FIG. 15E, voice guidance to the effect "BEEP. THE WAY TO SHIZUOKA IS ABOUT ONE KILOMETER AHEAD. TAKE THE RIGHTWARD DIRECTION." is provided in a case where the vehicle proceeds from the main road of an expressway to a main road and, moreover, there is no destination direction data and direction determination is impossible.

Figure 15F:
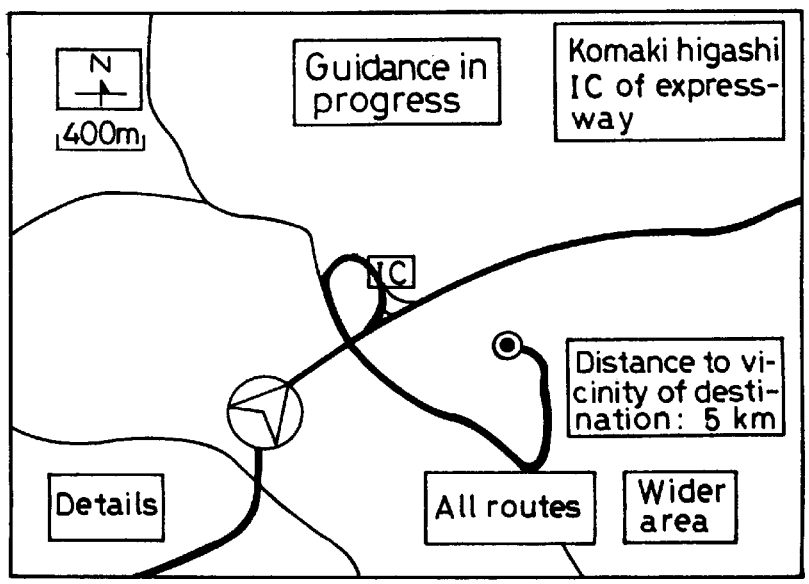

In FIG. 15F, voice guidance to the effect "BEEP. THE EXIT OF THE KOMAKI HIGASHI INTERCHANGE OF THE EXPRESSWAY IS ABOUT ONE KILOMETER AHEAD." is provided in a case where the vehicle proceeds from the main road of an expressway to an ancillary road.

Figure 16A:
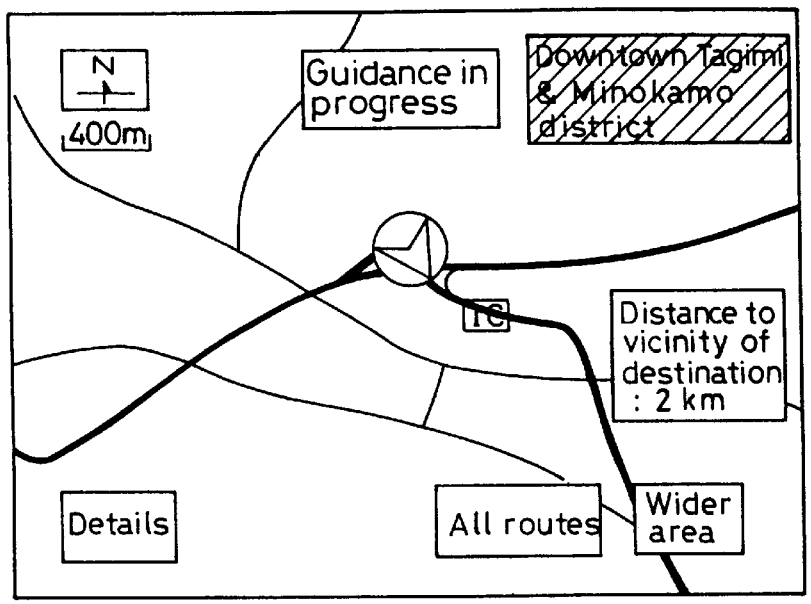
Figure 16B:
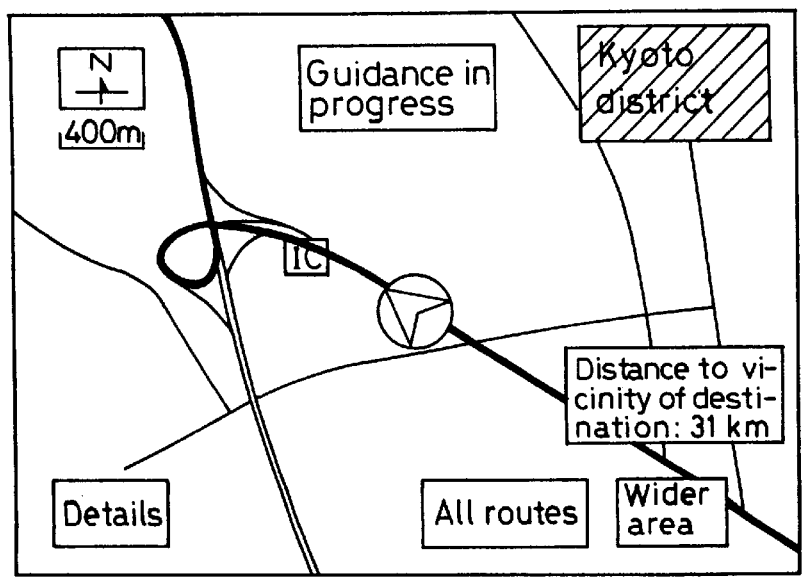

FIGS. 16(A)–(B) illustrate examples in which a display reading "DISTRICT" is added to the upper right-hand corner of the screen in a case where there is no destination direction data and direction determination is impossible, as in FIG. 15(D). This makes it easy to understand that the district name displayed on the map screen represents a district.

An arrow indicating direction is displayed in FIGS. 15C and 15E. In a case where direction guidance is performed by direction determination based upon heading, the shape of the arrow to be displayed is decided based upon the direction determined. In a case where guidance is provided based upon direction data, the shape of the arrow to be displayed is decided based upon this data. By way of example, the data indicative of the arrow displayed is divided into three types, namely data representing the rightward direction, data representing the leftward direction and data representing the straight-ahead direction, and these may be allocated with regard to directions obtained by direction determination or direction data in the manner described above. Thus, an arrow indicating direction is displayed together with the district name. As a result, in a case where it is difficult to distinguish which direction should be taken based solely upon a map displayed on a screen, the driver is capable of driving without anxiety by confirming beforehand the district signals posted along the road.

In the embodiment described above, direction data of a departing road relative to an approach road connected to it by a branch point is stored as direction destination data [FIG. 3(D)] and destination direction data [FIG. 3(E)] in guidance data [FIG. 3(C)] contained in suggested road data [FIG. 3(A)]. In other words, in a sequence of suggested roads, road data of a road departing a branch point is read in and guidance information at a branch point is outputted. However, an arrangement may be adopted in which direction data of each road departing on the side of a road approaching a branch point is stored and the guidance information is outputted. Further, an arrangement may be adopted in which guidance information at a branch point is stored in branch-point data and, with regard to a plurality of roads connected to this data at the branch point, direction data is stored beforehand regarding all combinations from roads on the approach side to roads on the departure side. Output of such guidance information is performed.

Figure 18:
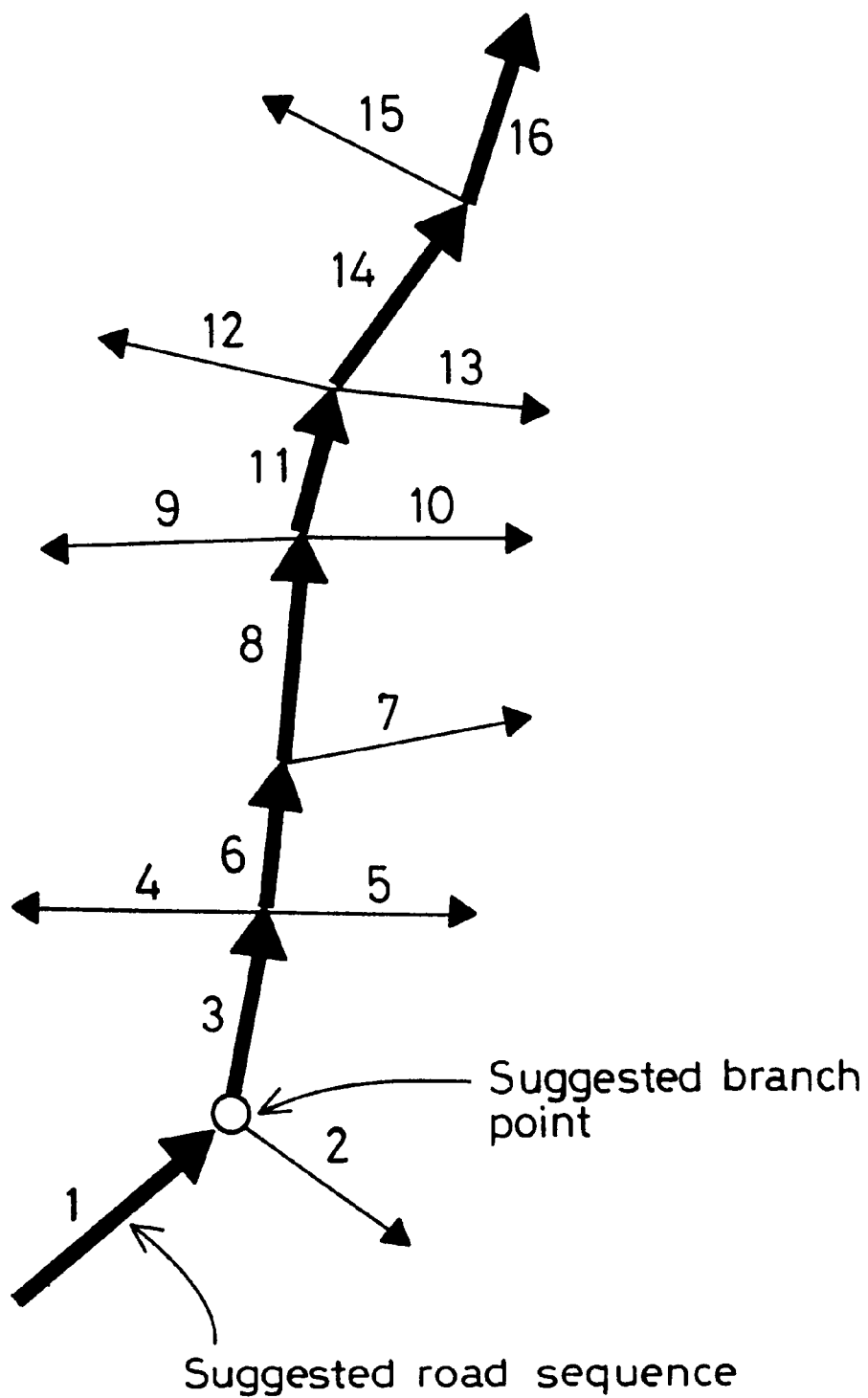
FIG. 18 is a diagram for describing the processing of FIG. 17.

FIG. 17 is a flowchart showing the flow of processing for setting auxiliary guidance at step S34 in FIG. 8, and FIG. 18 is a diagram for describing an example of this processing. First, at step S51, the destination name of a road departing from a branch point is retrieved from the destination data of FIG. 3(D). If there is a destination name, destination-name audio is set as auxiliary audio at step S55. If there is no destination name, the program proceeds to step S52. Here the road attributes of the road departing from the branch point from guidance road data of the destination road (departing road) in FIG. 3(A) is acquired from the road-attribute data serving as the road-guidance auxiliary information data of FIG. 4A. For example, in FIG. 18, first the road attributes of the road of road number 3 departing from the suggested branch point are acquired. Next, at step S53, it is determined whether the road-attribute data has overpass or underpass data. In case of overpass or underpass data, the program proceeds to step S54, where processing for setting overpass/underpass guidance is executed.

In a case where the overpass or underpass data is not found in the road currently being examined, the program proceeds to step S56, at which it is determined whether the distance from the suggested branch point to end point of the road currently being examined (namely the distance to the end point of the arrows of the sequence of suggested roads) is greater than a predetermined distance. If the distance is greater than the predetermined distance, then the program proceeds to other processing. If the distance is not greater than the predetermined distance, then the suggested-road data of the next sequence of suggested roads (road number 6 in a case where the road sequence currently being investigated is road number 3) connected to the end point of the road currently being investigated is acquired at step S57.

Next, at step S58, it is determined based upon the suggested-road data of the road to be connected whether guidance is unnecessary. In other words, in a case where the road of road number 6 is connected to the road of road number 3, as shown in FIG. 18, it is determined whether guidance for the road of road number 6 is unnecessary at the connecting branch point of road number 3 and road number 6. In a case where guidance is unnecessary, i.e., in a case where guidance is required, the program proceeds to the next processing state. If guidance is unnecessary, the program returns to step S53 and road-attribute data contained in the suggested-road data of road number 6 is retrieved. Thus, in a case where an auxiliary guidance setting of a suggested branch point shown in FIG. 18 is carried out, the roads departing from the suggested branch point are examined in order in the manner of road numbers 3→6→8→ . . . to determine whether the end of the road exceeds a predetermined value, whether there is a road sequence which requires guidance, or until there is overpass/underpass data. It is determined at step S56 whether the distance from the suggested branch point to the road end point is greater than a predetermined distance. The predetermined distance may be a straight-line distance or the actual distance of the suggested route. The processing shown in FIG. 17 represents the details of processing in determination means which determines whether road-guidance auxiliary information data (road-attribute data) serving as auxiliary guidance of branch-point guidance is to be added onto the branch-point guidance.

Figure 19:
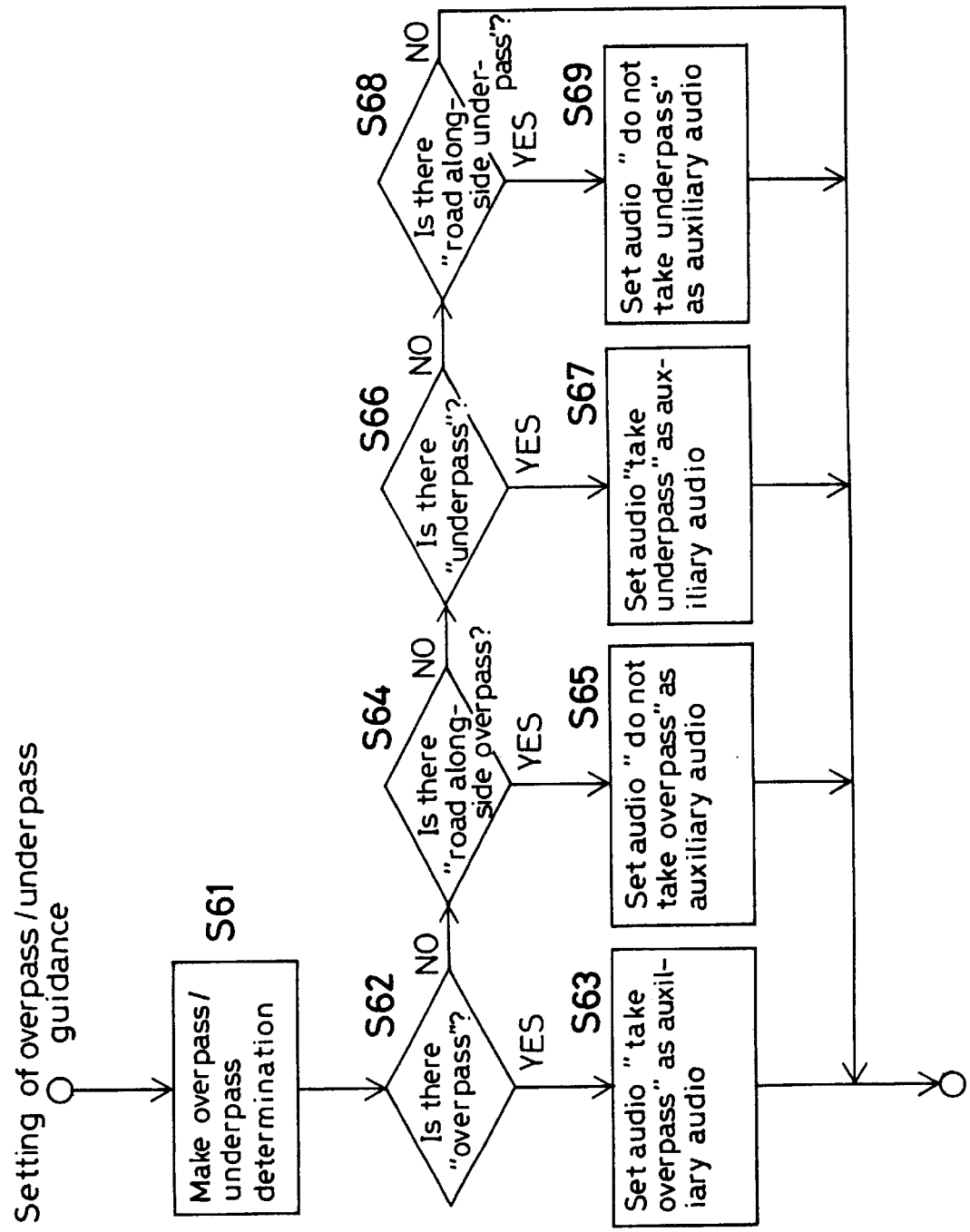
FIG. 19 is a flowchart showing the flow of processing for setting overpass/underpass guidance.

FIG. 19 is a flowchart showing the flow of processing for setting overpass/underpass guidance at step S54 in FIG. 17. An overpass/underpass determination is made at step S61 based upon the road-attribute data of FIG. 4A. If it is determined at step S62 that the suggested road has an "OVERPASS", audio "TAKE OVERPASS" is set as the auxiliary audio at step S63. If it is determined at step S62 that the suggested road does not have an "OVERPASS", then it is determined at step S64 whether the suggested road has a "ROAD ALONGSIDE OVERPASS". If the answer is "YES", then audio "DO NOT TAKE OVERPASS" is set as the auxiliary audio at step S65. If it is determined at step S64 that the suggested road does not have a "ROAD ALONGSIDE OVERPASS", then it is determined at step S66 whether the suggested road has an "UNDERPASS". If the answer is "YES", then audio "TAKE UNDERPASS" is set as the auxiliary audio at step S67. If it is determined at step S62 that the suggested road does not have an "UNDERPASS", then it is determined at step S68 whether the suggested road has a "ROAD ALONGSIDE UNDERPASS". If the answer is "YES", then audio "DO NOT TAKE UNDERPASS" is set as the auxiliary audio at step S69.

The above-mentioned auxiliary audio is voice guidance performed by a determination based upon the suggested-road data, as opposed to the main audio, which is voice guidance performed by the determination based upon angular difference.

Figure 20A:
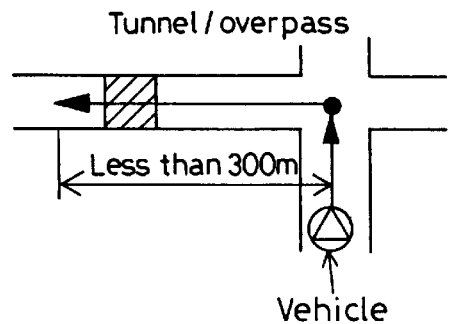
FIGS. 20(A)–(E) are the diagrams illustrating specific guidance scenes and guidance expressions regarding an overpass and underpass.
Figure 20B:
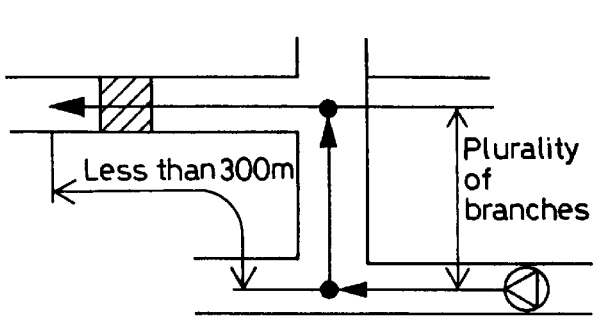

FIGS. 20(A)–(E) are the diagrams illustrating a specific guidance scene and guidance expression regarding an overpass and underpass. FIG. 20A is for a situation where there is one branch point within a predetermined distance (300 m, for example). Here voice guidance "BEEP. TAKE THE LEFTWARD DIRECTION ABOUT 300 METERS AHEAD. THERE WILL BE AN UNDERPASS (OVERPASS)" is provided, followed by the voice guidance "TURN LEFT SOON. THERE WILL BE AN UNDERPASS (OVERPASS). USE CAUTION". FIG. 20B is for a situation where there are a plurality of branch points within a predetermined distance (300 m, for example). Here voice guidance "BEEP. TAKE THE LEFTWARD DIRECTION ABOUT 300 METERS AHEAD" is provided, followed by the voice guidance "TURN RIGHT SOON, THEN TURN LEFT. THERE WILL BE AN UNDERPASS (OVERPASS). USE CAUTION".

Figure 20C:
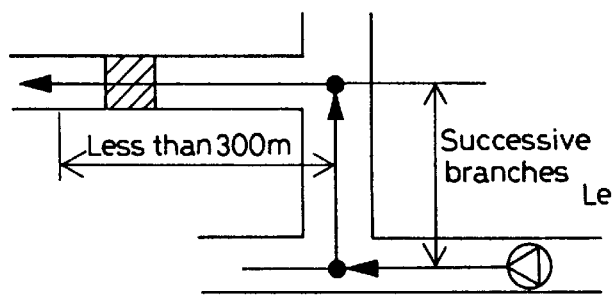
Figure 20D:
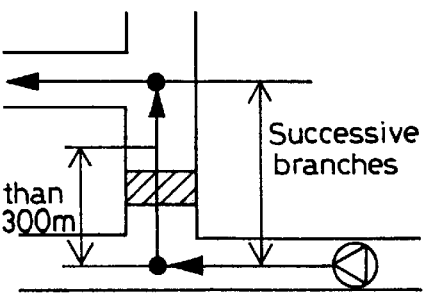
Figure 20E:
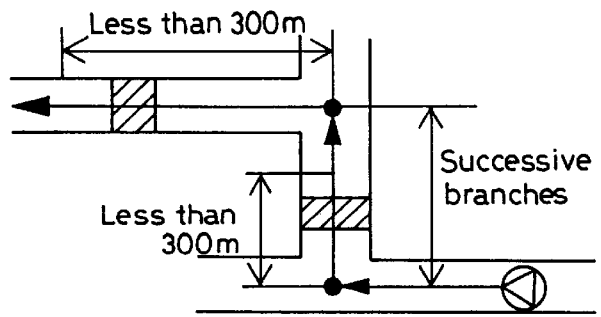

FIGS. 20C–20E are for situations in which there are a succession of branch points within a predetermined distance. In the case of FIG. 20C, voice guidance "BEEP. TAKE THE RIGHTWARD DIRECTION ABOUT 300 METERS AHEAD" is provided, followed by the voice guidance "TURN RIGHT SOON, THEN TURN LEFT 500 METERS BEYOND. THERE WILL BE AN UNDERPASS (OVERPASS). USE CAUTION". In the case of FIG. 20D, voice guidance "BEEP. TAKE THE RIGHTWARD DIRECTION ABOUT 300 METERS AHEAD. THERE WILL BE AN UNDERPASS (OVERPASS)" is provided, followed by the voice guidance "TURN RIGHT SOON. THERE WILL BE AN UNDERPASS (OVERPASS). TAKE THE LEFTWARD DIRECTION 500 METERS BEYOND. USE CAUTION". In the case of FIG. 20E, voice guidance "BEEP. TAKE THE RIGHTWARD DIRECTION ABOUT 300 METERS AHEAD. THERE WILL BE AN UNDERPASS (OVERPASS)" is provided, followed by the voice guidance "TURN RIGHT SOON. THERE WILL BE AN UNDERPASS (OVERPASS). TAKE THE LEFTWARD DIRECTION 500 METERS BEYOND. THERE WILL BE AN UNDERPASS (OVERPASS). USE CAUTION".

Figure 21A:
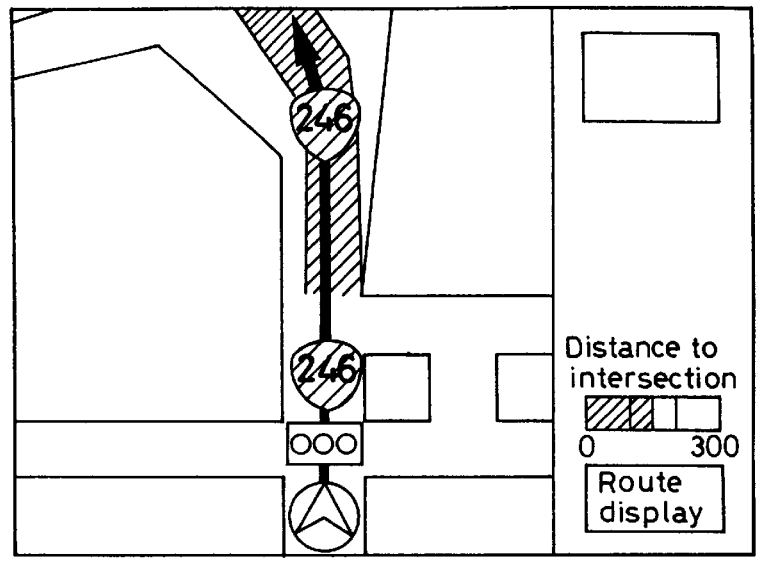
FIGS. 21(A)–(B) are the diagrams for describing voice guidance at branch points conforming to specific examples of screens.
Figure 21B:
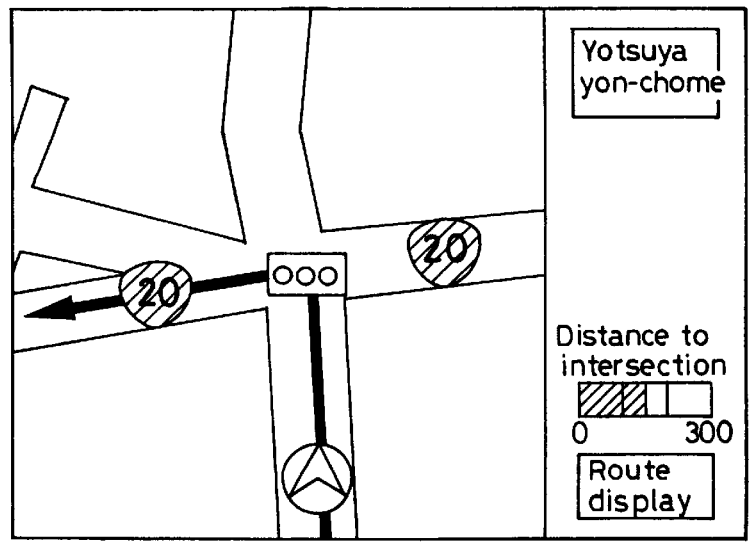

FIGS. 21(A)–(B) are the diagrams for describing voice guidance at branch points conforming to specific examples of screens. FIG. 21A illustrates an example of guidance in a case where there is an overpass immediately ahead of an intersection, and FIG. 21B illustrates an example of guidance in a case where there is a tunnel immediately after a left turn at an intersection.

Figure 22:
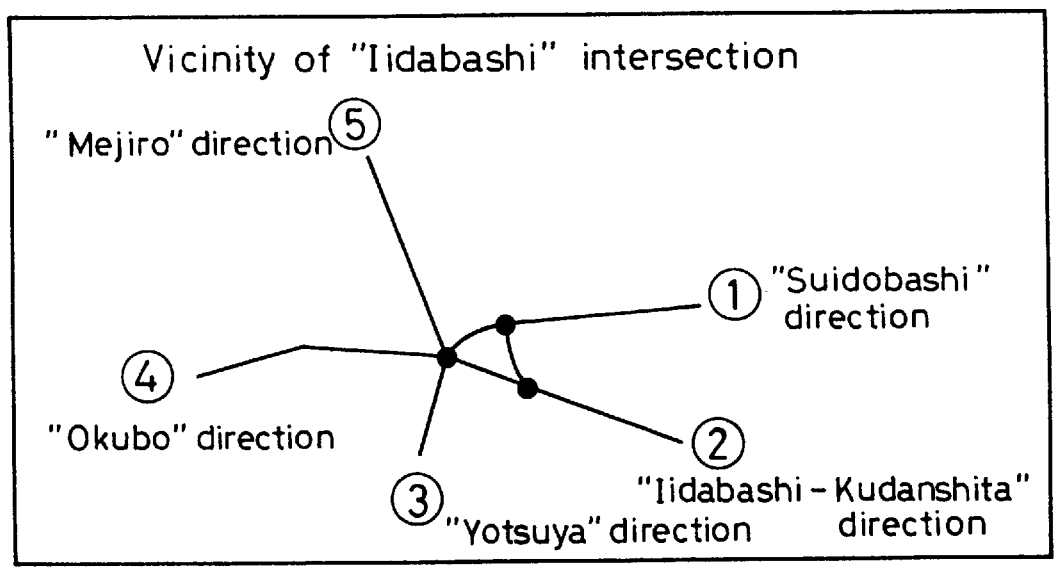
FIG. 22 is a diagram illustrating another embodiment showing an example of a complicated intersection.

Another embodiment of the present invention will be described with reference to FIG. 22. FIG. 22 is a diagram illustrating another embodiment showing an example of a complicated intersection. Specifically, this illustrates the "Iidabashi Intersection", at which the number of intersects is six. Since guidance is difficult to understand with merely left-right guidance at such a complicated intersection, direction names ①~⑤ displayed at the intersection are instructed supplementarily by voice after the direction of travel is instructed by voice. Further, in a case where direction is not displayed at an intersection, the fact that there is no direction name is instructed by voice. This direction name is put into the form of data as a destination name in the destination data of FIG. 3(D). It should be noted that turns which are prohibited are ②→①, ③→②, ⑤→③,⑤→④. Since there is no mistaking ①→③, ③→①, voice guidance is not required.

Figure 23:
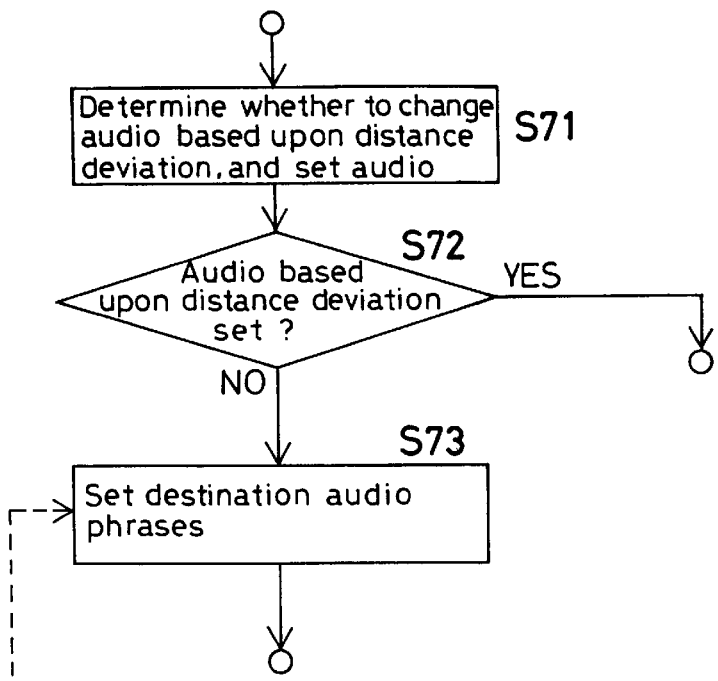
FIG. 23 is a flowchart illustrating, as a modification of the invention, the flow of processing for changing voice expression in a case where a distance deviation has occurred.
Figure 24:
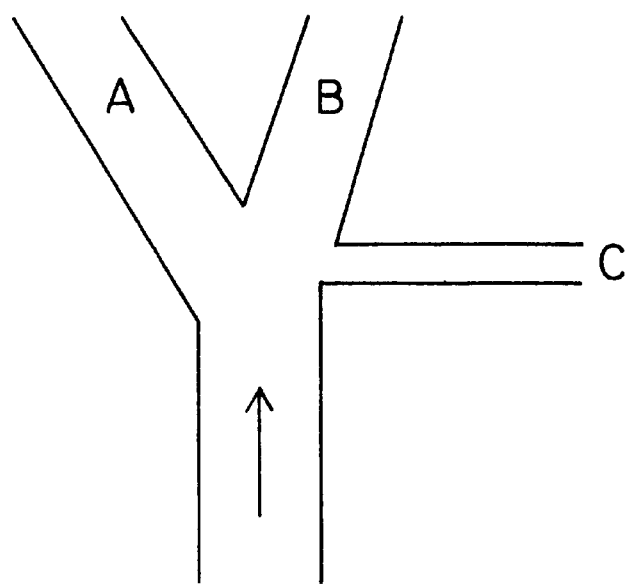
FIGS. 24 and 25 are diagrams showing the shape of a branch point for the purpose of describing problems which the present invention seeks to solve.

FIG. 23 is a flowchart illustrating, as a modification of the invention, the flow of processing for changing voice expression in a case where a distance deviation has occurred. In the vehicular navigation system according to the present invention, correction of vehicle position on the map based upon a turn determination when a left or right turn is made at an intersection is performed during route guidance, and map matching is carried out. However, in a case where there is a long section along which guidance such as that for a left or right turn is not performed, there is no chance to perform the aforementioned correction. Therefore, if a section along which guidance is not provided continues for a distance greater than a predetermined distance, there is a possibility that the position of the vehicle on the map will deviate.

Accordingly, in a case where a section along which guidance is not provided continues for a distance greater than a predetermined distance, "distance deviation" is judged to have occurred and a change in the content of the audio output is made possible. To this end, the guidance audio is divided upon into the various phrases for the "beep" (guidance tone), guidance distance, intersection name and direction of travel, etc., thereby making it possible to change each phrase with the exception of the "beep" phrase. A determination as to whether to produce an audio output is performed phrase by phrase, and guidance audio is created so as to exclude phrases relating especially to guidance distance, such as "ABOUT 700 METERS AHEAD" or "ABOUT 300 METERS AHEAD". Besides the case in which a section along which guidance is not given continues in excess of a predetermined distance is adopted as a condition for judging "distance deviation", there is also a case where the vehicle has traveled along a retrieved route upon departing from a location (e.g., a parking lot) that has not been stored in the data base. Such a case is also regarding as being indicative of "distance deviation" and the appropriate guidance audio is created until position is corrected by the next left or right turn at an intersection.

Thus, as set forth above, the present invention is such that before the present position of a vehicle reaches a branch point or intersection at which guidance is necessary on a retrieved route, the direction of travel to be taken next at the branch point or intersection is indicated by voice and display. If, at this time, there is a case where the suggested route includes a complicated branch point of the type where the direction of travel cannot be specified by a voice representation such as forward, backward, left, right, diagonally left or diagonally right, the driver is capable of reliably proceeding on the road to be traveled by being notified of the road a predetermined distance ahead of the branch point. More specifically, in a case where an overpass and a parallel road alongside it exist at a branch point, an underpass and a parallel road alongside it exist or a branch point having a complication shape of the kind shown in FIG. 25 exists, an indication of road information is given regarding a road to be traveled on a suggested route, such as an indication of an overpass, underpass or tunnel in the form "TAKE THE OVERPASS" or "TAKE THE UNDERPASS". As a result, guidance at a complicated branch point having many branches can be provided reliably.

Figure 25:
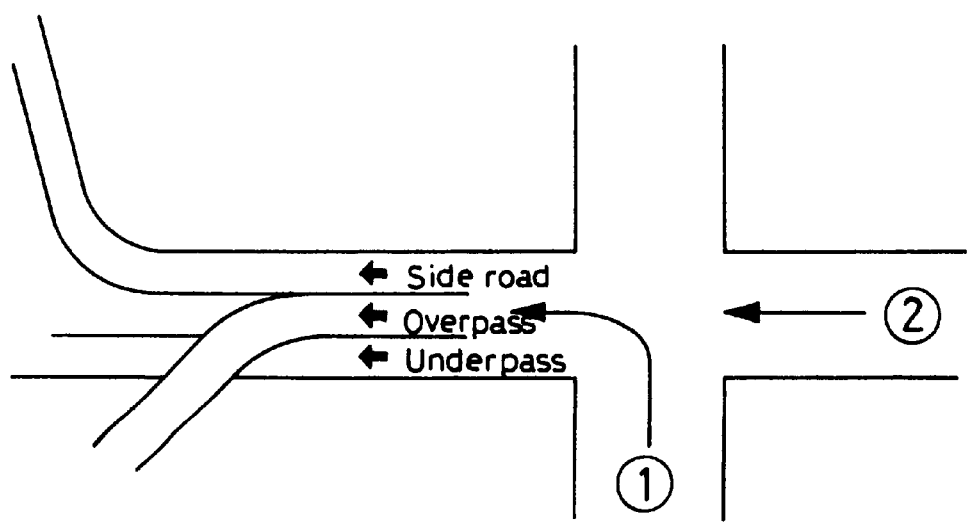

In particular, at a complicated branch point or intersection of the kind shown in FIG. 25 or FIG. 21B, a case in which a complicated branch point is located immediately after a right or left turn, as shown at ① in FIG. 25, is such that it is more difficult for the driver to ascertain the presence of an underpass or overpass, and it is more likely that the driver will overlook the underpass or overpass, than in a case where the complicated branch point is located straight ahead in the direction of travel, as shown at ②. (In the case where the complicated branch point is located straight ahead, the presence of the overpass or underpass ahead can be ascertained by eye and the driver therefore has enough time to verify, by means of the display, the direction in which to travel.) By informing the driver of the presence of the complicated branch point by voice in advance, the driver will not become perplexed and can be provided with reliable guidance.

In this embodiment, the arrangement is such that road information data representing an overpass, underpass or tunnel is stored in the information storage device as road data. However, an arrangement may be adopted in which this data is stored in the information storage device not as road information but as branch-point data. However, storing the road information data as road data makes it possible to readily store data indicating the state of connection between roads, such as information indicating that entering one road from another road is prohibited. This means that less data suffices in comparison with a case in which the road information data is stored as branch-point data.

As many apparently widely different embodiments of the present invention can be made without departing from the spirit and scope thereof, it is to be understood that the invention is not limited to the specific embodiments thereof except as defined in the appended claims.

What is claimed is:

1. A navigation system for a vehicle, comprising:
present-position sensing means for calculating present position of the vehicle;
input means for entering information necessary for calculating a route;
output means for giving notification of information for carrying out route guidance;
an information storage device in which all data necessary to carry out route guidance has been stored;
route calculating means for calculating a route based upon the information entered by said input means; and
a central processor having route storage means for temporarily storing the route calculated by said route calculating means, and guidance control means for outputting guidance information relating to the route to said output means;
said information storage device storing branch-point data and road data connected to branch points and having destination direction data indicative of a departing road with respect to an approach road connected thereto by a branch point;
said guidance control means comprises determination means for determining whether or not destination direction data of a departing road with respect to an approach road connected thereto by a branch point is available in said route storage means, and an arithmetic means for calculating advancing direction based on angular difference which the departing road forms with the approach road and in case it is determined by said determination means that the destination direction data is available guidance information is outputted to the output means based on the destination direction data, and in case it is determined that the destination direction data is not available, advancing direction is calculated by said arithmetic means, and guidance information is outputted to the output means based on said advancing direction.

2. The system according to claim 1, wherein said output means comprises display means for giving notification, on a screen, of the information necessary to carry out route guidance, and/or voice output means for giving notification, by voice, of the information necessary to carry out route guidance, and that said guidance control means comprises display control means for outputting the guidance information to said display means and/or voice control means for outputting the guidance information to said voice output means.

3. The system according to claim 2, wherein said display control means outputs arrow information indicating direction based upon the destination direction data to said output means, and said display means displays an arrow on the screen based upon the arrow information.

4. A navigation system for a vehicle, comprising:
present-position sensing means for calculating present position of the vehicle;
input means for entering information necessary for calculating a route;
output means for giving notification of information for carrying out route guidance;
information storage means in which all data necessary to carry out route guidance has been stored;
route calculating means for calculating a route based upon the information entered by said input means; and
guidance control means for reading out data, which has been stored in said information storage means, along the route calculated by said route calculating means, and outputting this data to said output means;
wherein said information storage means stores route-guidance auxiliary information data, and said guidance control means reads data relating to a branch point at which guidance is required for travel forward of the present position, which has been sensed by said present-position sensing means, out of data relating to a route, which has been stored in said information storage means, in a case where the present position is on a route, currently being suggested, calculated by said route calculating means, said guidance control means having determination means for determining whether the route-guidance auxiliary information data is to be added onto guidance relating to said branch point, wherein when it has been determined by said determination means that the route-guidance auxiliary information is to be added onto the guidance relating to the branch point, said guidance control means adds the route-guidance auxiliary information onto the guidance relating to the branch point and then outputs the result to said output means.

5. The system according to claim 4, wherein said determination means retrieves data, from among data relating to a route calculated by said route calculating means and stored in said information storage means, within a predetermined range beyond the branch point at which guidance is required, and, in a case where the information-guidance auxiliary information data in said data, determines that said road-guidance auxiliary information data is to be added onto the guidance relating to said branch point.

6. The system according to claim 4, wherein said information storage means stores data, which is necessary to perform the route guidance, in correspondence with respective ones of roads connecting each branch point, and stores the route, calculated by said route calculating means, as a road sequence, and said determination means determines that said road-guidance auxiliary information data is to be added onto the guidance relating to said branch point in a case where, among the data stored in the road sequence of the route, the data of a road sequence within a predetermined distance beyond the branch point at which guidance is necessary or the data of a road sequence up to a road spanning a predetermined distance contains said road-guidance auxiliary information data.

7. The system according to claim 5 or 6, wherein said determination means determines that road-guidance auxiliary information retrieved first in order of proximity to the branch point is to be added onto the guidance relating to said branch point.

8. The system according to claim 4, herein said road-guidance auxiliary information data represents an overpass, a road alongside an overpass, an underpass, a road alongside an underpass or a direction name in a direction of travel at a branch point.

* * * * *